US009388065B2

(12) United States Patent
Agrawal et al.

(10) Patent No.: US 9,388,065 B2
(45) Date of Patent: Jul. 12, 2016

(54) GLASS MANUFACTURING APPARATUS AND METHODS FOR MANUFACTURING A GLASS RIBBON

(71) Applicant: Corning Incorporated, Corning, NY (US)

(72) Inventors: Anmol Agrawal, Corning, NY (US); Steven Roy Burdette, Big Flats, NY (US); Gautam Narendra Kudva, Horseheads, NY (US); Michael Yoshiya Nishimoto, Horseheads, NY (US); Vinay Patel, Shizuoka (JP)

(73) Assignee: Corning Incorporated, Corning, NY (US)

( * ) Notice: Subject to any disclaimer, the term of this patent is extended or adjusted under 35 U.S.C. 154(b) by 175 days.

(21) Appl. No.: 13/904,234

(22) Filed: May 29, 2013

(65) Prior Publication Data

US 2013/0319050 A1  Dec. 5, 2013

Related U.S. Application Data

(60) Provisional application No. 61/653,806, filed on May 31, 2012.

(51) Int. Cl.
C03B 17/06 (2006.01)
(52) U.S. Cl.
CPC ................... C03B 17/068 (2013.01)
(58) Field of Classification Search
USPC .......................... 65/91, 90, 97, 185, 148, 253
See application file for complete search history.

(56) References Cited

U.S. PATENT DOCUMENTS

| 4,612,030 | A  | * | 9/1986 | Smids ............................... 65/91 |
| 6,758,064 | B1 | * | 7/2004 | Kariya ............................... 65/91 |
| 8,627,684 | B2 | * | 1/2014 | Shultz et al. ....................... 65/91 |
| 2009/0107182 | A1 |  | 4/2009 | Anderson et al. .................. 65/90 |
| 2013/0133371 | A1 | * | 5/2013 | Burdette et al. ................... 65/91 |
| 2013/0219964 | A1 | * | 8/2013 | Kudva ............................ 65/29.1 |

FOREIGN PATENT DOCUMENTS

JP      2007-051028      3/2007

OTHER PUBLICATIONS

PCT/US2013/042983, Filed May 29, 2013, PCT Search Report and Written Opinion.

* cited by examiner

*Primary Examiner* — Mark Halpern
(74) *Attorney, Agent, or Firm* — Thomas R. Beall; Ryan T. Hardee

(57) ABSTRACT

A glass manufacturing apparatus is described herein that comprises a forming device configured to produce a glass ribbon and a pull roll device which draws the glass ribbon downward from the forming device. The pull roll device has a first roll apparatus, a second roll apparatus, and a third roll apparatus. The pull roll device is configured to at least independently operate the first roll apparatus and the second roll apparatus such that at least one of a first upstream pair of draw rolls rotates with a substantially constant torque and at least one of a first downstream pair of draw rolls rotates with a substantially constant angular velocity. In further examples, methods of manufacturing a glass ribbon are provided.

23 Claims, 13 Drawing Sheets

GLASS MANUFACTURING APPARATUS AND METHODS FOR MANUFACTURING A GLASS RIBBON

CROSS-REFERENCE TO RELATED APPLICATIONS

This application claims the benefit of priority under 35 U.S.C. §119 of U.S. Provisional Application Ser. No. 61/653,806 filed on May 31, 2012, the entire content of which is hereby incorporated by reference.

TECHNICAL FIELD

The present disclosure relates to the glass manufacturing field and, more particularly, to a glass manufacturing apparatus, and methods for manufacturing a glass ribbon using a pull roll device with at least a first roll apparatus, a second roll apparatus, and a third roll apparatus.

BACKGROUND

Glass manufacturing apparatuses are known to produce glass sheets, for example, by a fusion down draw process. The co-assigned U.S. Patent Application Publication No. 2009/0107182 A1 that was published on Apr. 30, 2009 to Anderson et al. discloses an exemplary glass manufacturing apparatus with a lower pull roll apparatus having a master motor that rotates a lower pair of rolls at a constant angular velocity. The exemplary glass manufacturing apparatus further includes an upper pull roll apparatus with upper slave motors configured to rotate an upper pair of rolls at torques that match a predetermined percentage of the measured torque of the master motor of the lower pair of rolls. The master-slave configuration of the lower pull roll apparatus and the upper pull roll apparatus of the Anderson et al. publication can be beneficial under various process applications. However, there is still a desire to enhance the glass manufacturing apparatus to have a configuration that is beneficial for a wide-range of process applications.

SUMMARY

A glass manufacturing apparatus and methods for manufacturing a glass ribbon are described in the independent claims of the present application. Advantageous embodiments of the glass manufacturing apparatus, and the methods for manufacturing a glass ribbon are described in the dependent claims.

In one aspect of the disclosure, there is provided a glass manufacturing apparatus which comprises: (a) a forming device configured to produce a glass ribbon including a width extending between a first edge portion and a second edge portion; and (b) a pull roll device comprising: (i) a first roll apparatus including a first upstream pair of draw rolls configured to draw the first edge portion of the glass ribbon from the forming device along a draw path extending transverse to the width of the glass ribbon; (ii) a second roll apparatus including a first midstream pair of rolls positioned downstream along the draw path from the first upstream pair of draw rolls, wherein the first midstream pair of rolls are configured to interact with the first edge portion of the glass ribbon; (iii) a third roll apparatus including a first downstream pair of draw rolls positioned downstream along the draw path from the first midstream pair of rolls, wherein the first downstream pair of draw rolls are configured to further draw the first edge portion of the glass ribbon along the draw path; and (iv) a control device configured to independently operate at least the first roll apparatus and the third roll apparatus such that at least one of the first upstream pair of draw rolls rotates with a substantially constant torque and at least one of the first downstream pair of draw rolls rotates with a substantially constant angular velocity. The glass ribbon is drawn downstream from the forming device through a viscous zone, a setting zone, and then an elastic zone. In one example, the first upstream pair of draw rolls are located in the viscous zone, the first midstream pair of rolls are located in the setting zone, and the first downstream pair of draw rolls are located in the elastic zone. In another example, the first upstream pair of draw rolls are located in the setting zone, the first midstream pair of rolls are located in the setting zone, and the first downstream pair of draw rolls are located in the elastic zone.

In another aspect of the disclosure, there is provided a method of manufacturing a glass ribbon. The method comprising the steps of: (a) providing a pull roll device comprising: (i) a first roll apparatus including a first upstream pair of draw rolls; (ii) a second roll apparatus including a first midstream pair of rolls positioned downstream along the draw path from the first upstream pair of draw rolls; and (iii) a third roll apparatus including a first downstream pair of draw rolls positioned downstream along the draw path from the first midstream pair of rolls; (b) forming a glass ribbon with a width extending between a first edge portion and a second edge portion; (c) independently operating the first roll apparatus such that at least one of the first upstream pair of draw rolls rotates with a substantially constant torque to draw the first edge portion of the glass ribbon along the draw path; and (d) independently operating the third roll apparatus such that at least one of the first downstream pair of draw rolls rotates with a substantially constant angular velocity to further draw the first edge portion of the glass ribbon along the draw path. The glass ribbon is drawn downstream through a viscous zone, a setting zone, and then an elastic zone. In one example, the first upstream pair of draw rolls are located in the viscous zone, the first midstream pair of rolls are located in the setting zone, and the first downstream pair of draw rolls are located in the elastic zone. In another example, the first upstream pair of draw rolls are located in the setting zone, the first midstream pair of rolls are located in the setting zone, and the first downstream pair of draw rolls are located in the elastic zone.

In yet another aspect of the disclosure, there is provided a method of manufacturing a glass ribbon. The method comprising the steps of: (a) providing a pull roll device comprising: (i) a first roll apparatus including a first upstream pair of draw rolls; (ii) a second roll apparatus including a first midstream pair of rolls positioned downstream along the draw path from the first upstream pair of draw rolls; and (iii) a third roll apparatus including a first downstream pair of draw rolls positioned downstream along the draw path from the first midstream pair of rolls; (b) forming a glass ribbon with a width extending between a first edge portion and a second edge portion; (c) independently operating the first roll apparatus over a period of time such that the first upstream pair of draw rolls apply a substantially constant force to the first edge portion of the glass ribbon along the draw path; (d) independently operating the third roll apparatus over the period of time such that at least one of the first downstream pair of draw rolls rotates with a substantially constant angular velocity and the first downstream pair of draw rolls apply a varying force to the first edge portion of the glass ribbon along the draw path; and (e) sequentially separating a plurality of glass sheets from the glass ribbon over the period of time at a location downstream along the draw path from the first downstream pair of draw rolls. The glass ribbon is drawn downstream through a viscous zone, a setting zone, and then an elastic zone. In one example, the first upstream pair of draw rolls are located in the viscous zone, the first midstream pair of rolls are located in the setting zone, and the first downstream pair of draw rolls are located in the elastic zone. In another example, the first upstream pair of draw rolls are located in the setting zone, the first midstream pair of rolls are located in the setting zone, and the first downstream pair of draw rolls are located in the elastic zone.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
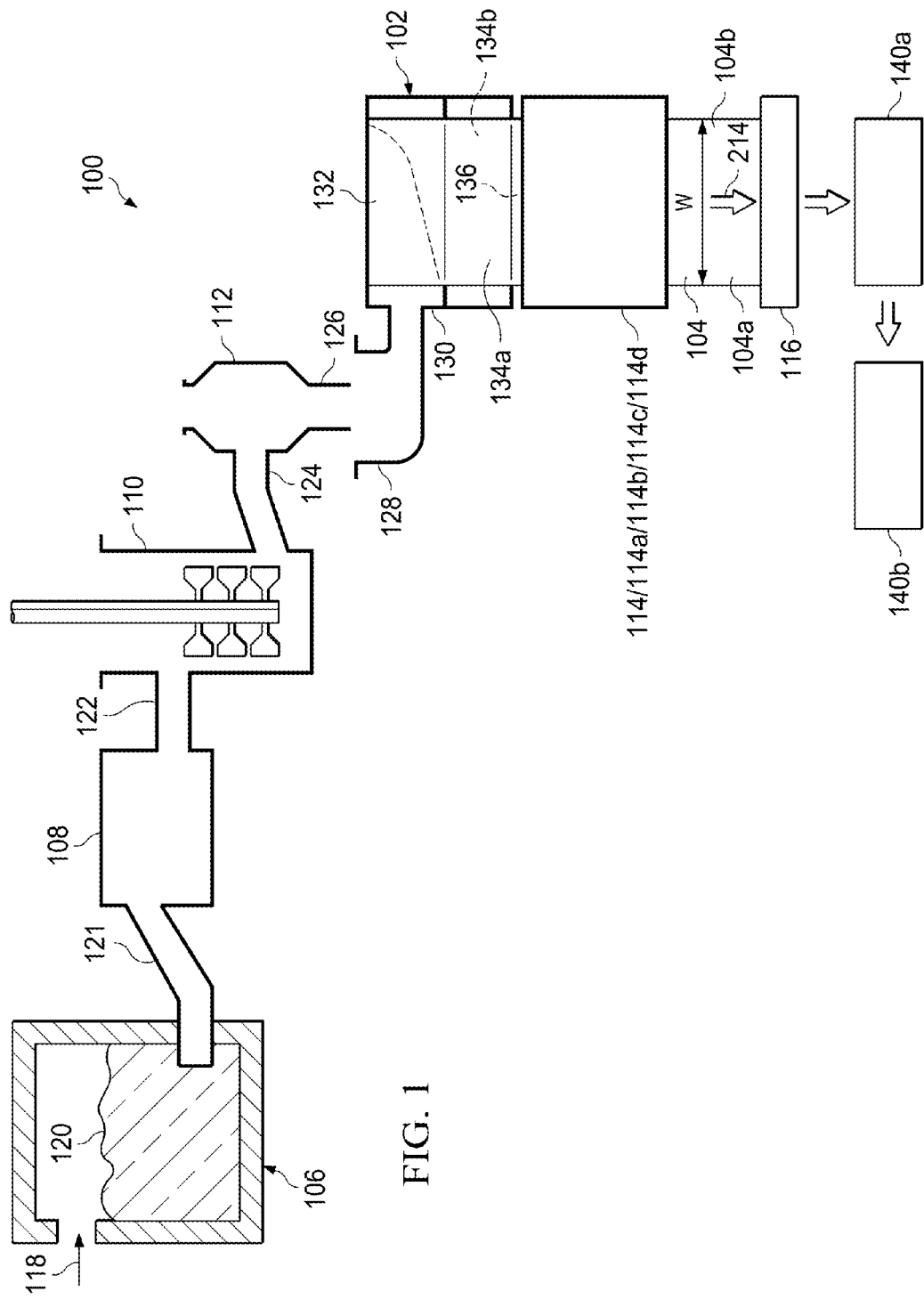
FIG. 1 is a schematic view of an exemplary glass manufacturing apparatus in accordance with examples of the disclosure.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Referring to FIG. 1, there is shown a schematic view of an exemplary glass manufacturing apparatus 100 which may be used in accordance with aspects of the disclosure. The exemplary glass manufacturing apparatus 100 is illustrated as a down draw fusion apparatus although other forming apparatuses may be used in further examples. In one example, the glass manufacturing apparatus 100 can include a forming device 102 to produce a glass ribbon 104 including a width "W" extending between a first edge portion 104a and a second edge portion 104b of the glass ribbon 104.

As further illustrated in FIG. 1, the glass manufacturing apparatus 100 can include a melting vessel 106, a fining vessel 108, a mixing vessel 110, a delivery vessel 112, the forming device 102, a pull roll device 114, 114a, 114b, 114c and 114d, and a separating device 116. The melting vessel 110 is where the glass batch materials are introduced as shown by arrow 118 and melted to form molten glass 120. The fining vessel 108 has a high temperature processing area that receives the molten glass 120 (not shown at this point) from the melting vessel 106 through an inclined tube 121 and in which bubbles are removed from the molten glass 120. The fining vessel 108 is connected to the mixing vessel 106 by a finer to stir chamber connecting tube 122. The mixing vessel 110 is connected to the delivery vessel 112 by a stir chamber to bowl connecting tube 124. The delivery vessel 112 delivers the molten glass 120 through a downcomer 126 to an inlet 128 and into the forming device 102.

Figure 2:
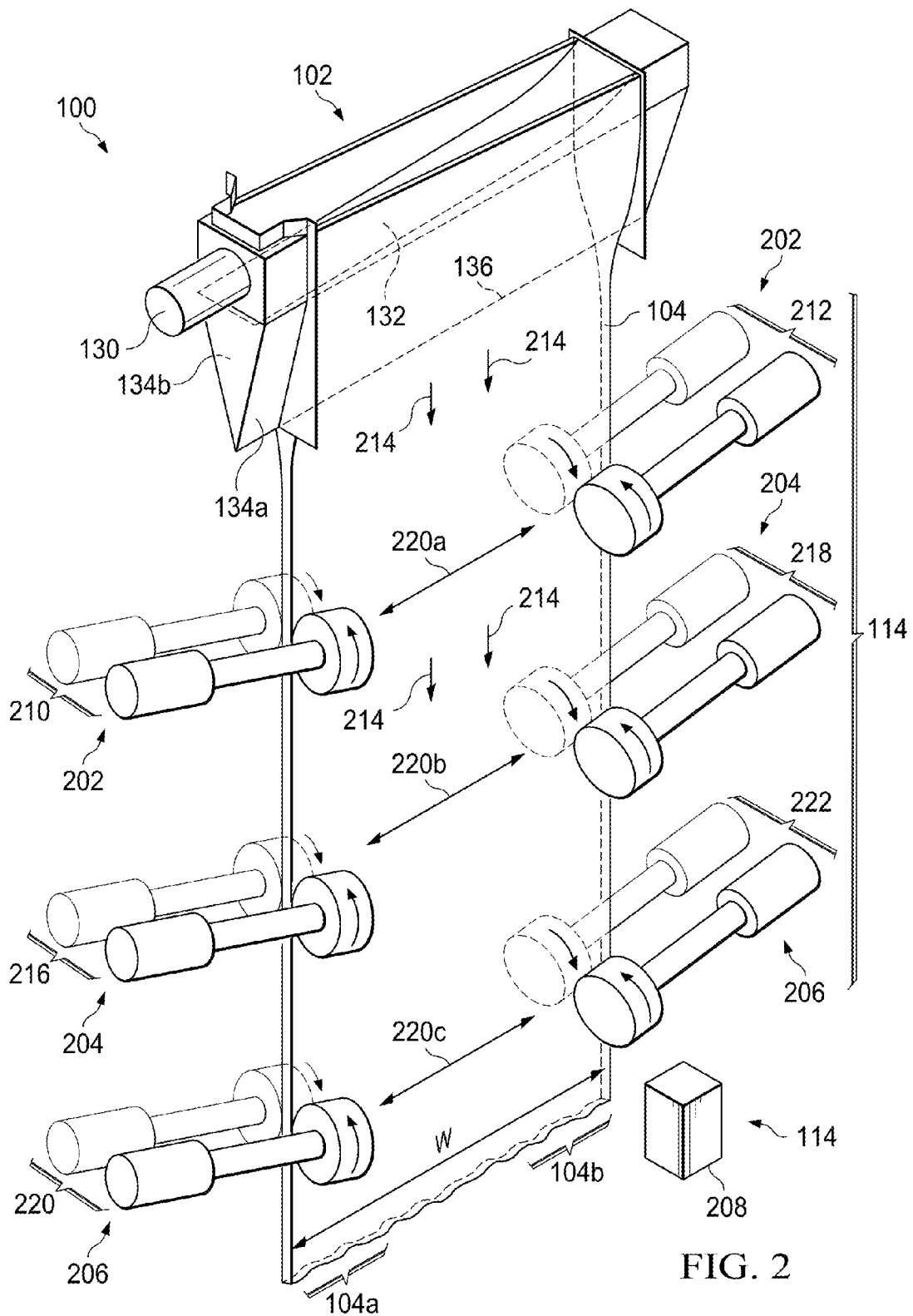
FIG. 2 is a perspective view of portions of the glass manufacturing apparatus of FIG. 1 including a pull roll device in accordance with an example of the disclosure.

There are various forming devices which may be used in accordance with aspects of the disclosure. For example, as shown in FIGS. 1 and 2, the exemplary forming device 102 includes an opening 130 that receives the molten glass 120 which flows into a trough 132. As best shown in FIG. 2, the molten glass 120 then overflows from the trough 132 and runs down two sides 134a and 134b before fusing together at a root 136 of the forming device 102. The root 136 is where the two sides 134a and 134b come together and where the two overflow walls of molten glass 120 flowing over each of the two sides 134a and 134b fuse together to form the glass ribbon 104 which is drawn downward off the root 136.

The glass manufacturing apparatus 100 further includes the pull roll device 114, 114a, 114b, 114c and 114d and the separating device 116 which are both schematically illustrated in FIG. 1. As will be discussed more fully below with respect to FIG. 2, the pull roll device 114 is provided to help draw the glass ribbon 104 from the root 136 and also draw the glass ribbon 104 to the desired thickness. The separating device 116 may be provided to sequentially separate a plurality of glass sheets 140a and 140b (only two shown) from the glass ribbon 104 over a period of time. The separating device 116 may comprise the illustrated traveling anvil machine although other types of separating devices may be utilized to sequentially separate a plurality of glass sheets 140a and 140b (only two shown) from the glass ribbon 104 over a period of time. In another alternative, the separating device 116 would not be present so the glass ribbon 104 would be rolled to form a wound coil of glass.

Referring to FIG. 2, a more detailed schematic is provided of the pull roll device 114 in accordance with one example of the disclosure. As shown in FIG. 2, the exemplary pull roll device 114 can include a first roll apparatus 202, a second roll apparatus 204, a third roll apparatus 206, and a control device 208 (e.g., programmable logic controller 208, processor-memory 208). In this example, the first roll apparatus 202 includes a first upstream pair of draw rolls 210 and a second upstream pair of draw rolls 212 configured to respectively draw the first edge portion 104a and the second edge portion 104b of the glass ribbon 104 from the forming device 102 along a draw path 214 extending transverse to the width "W" of the glass ribbon 104 (note: the draw rolls 210 and 212 are shown as being vertically down-tilted rolls 210 and 212 and applying a cross-tension 220a in the glass ribbon 104 but they could have a horizontal orientation and if they have a horizontal orientation then they could be connected to one another). The second roll apparatus 204 includes a first midstream pair of rolls 216 and a second midstream pair of rolls 218 which are respectively positioned downstream along the draw path 214 from the first upstream pair of draw rolls 210 and the second upstream pair of draw rolls 212 (note: the rolls 216 and 218 are shown as being vertically down-tilted rolls 216 and 218 applying a cross-tension 220b in the glass ribbon 104 but they could have a horizontal orientation and if they have a horizontal orientation then they could be connected to one another). The third roll apparatus 206 includes a first downstream pair of draw rolls 222 and a second downstream pair of draw rolls 224 which are respectively positioned downstream along the draw path 214 from the first midstream pair of rolls 216 and the second midstream pair of rolls 218 (note: the draw rolls 222 and 224 are shown as being vertically down-tilted rolls 222 and 224 and applying a cross-tension 220c in the glass ribbon 104 but they could have a horizontal orientation and if they have a horizontal orientation then they could be connected to one another). The control device 208 is configured at least to independently operate the first roll apparatus 202 and the third roll apparatus 206 such that at least one of the first upstream pair of draw rolls 210 rotates with a substantially constant torque and at least one of the first downstream pair of draw rolls 222 rotates with a substantially constant angular velocity. A more detailed discussion about different aspects of the pull roll device 114 while in different processing applications is provided below with respect to FIGS. 3-4.

Figure 3A:
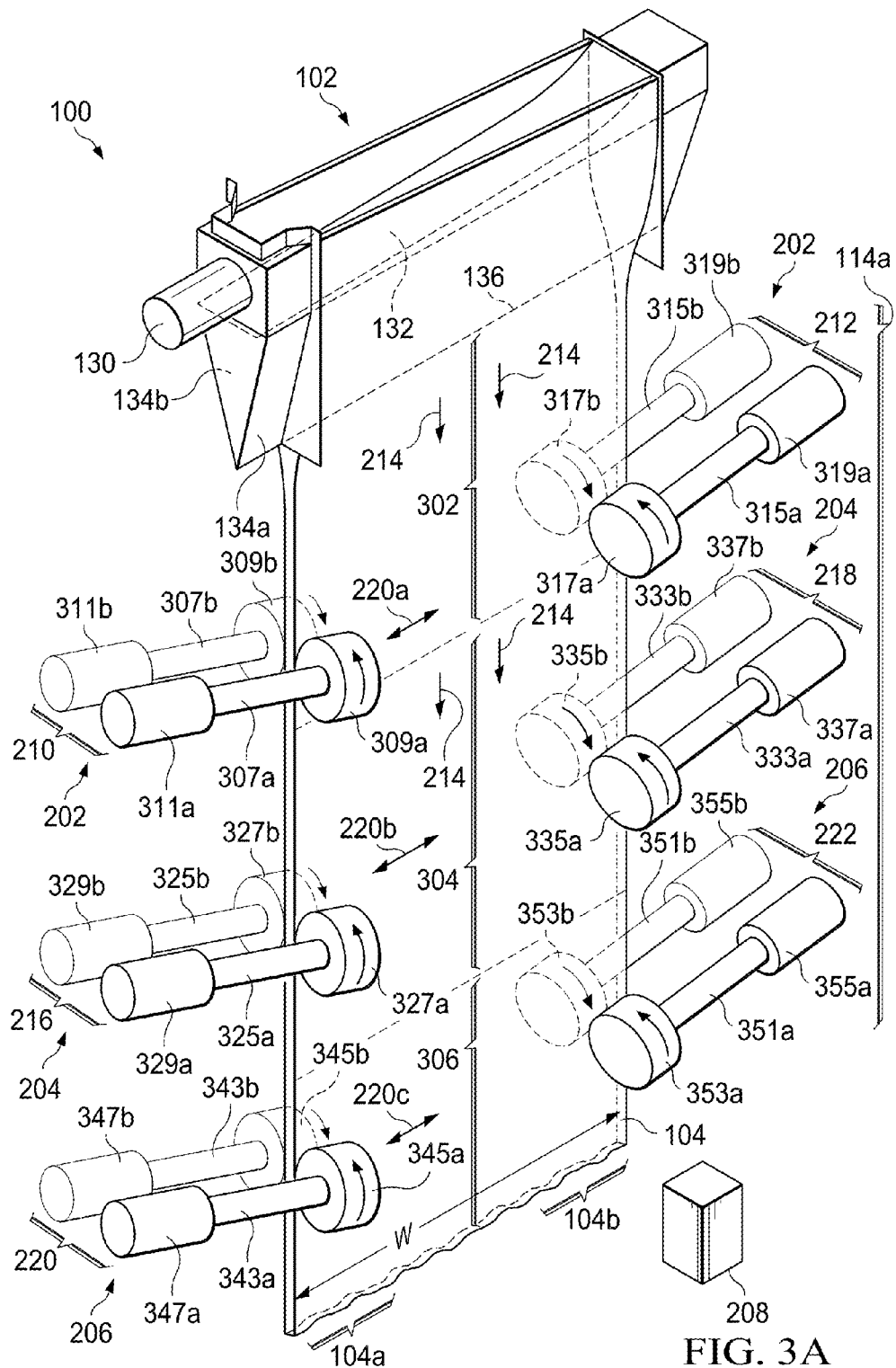
FIGS. 3A-3F are views of portions of the glass manufacturing apparatus of FIG. 1 illustrating different exemplary pull roll devices where each exemplary pull roll device includes a first roll apparatus located in a viscous zone, a second roll apparatus located in a setting zone, and a third roll apparatus located in an elastic zone in accordance with an example of the disclosure.
Figure 3B:
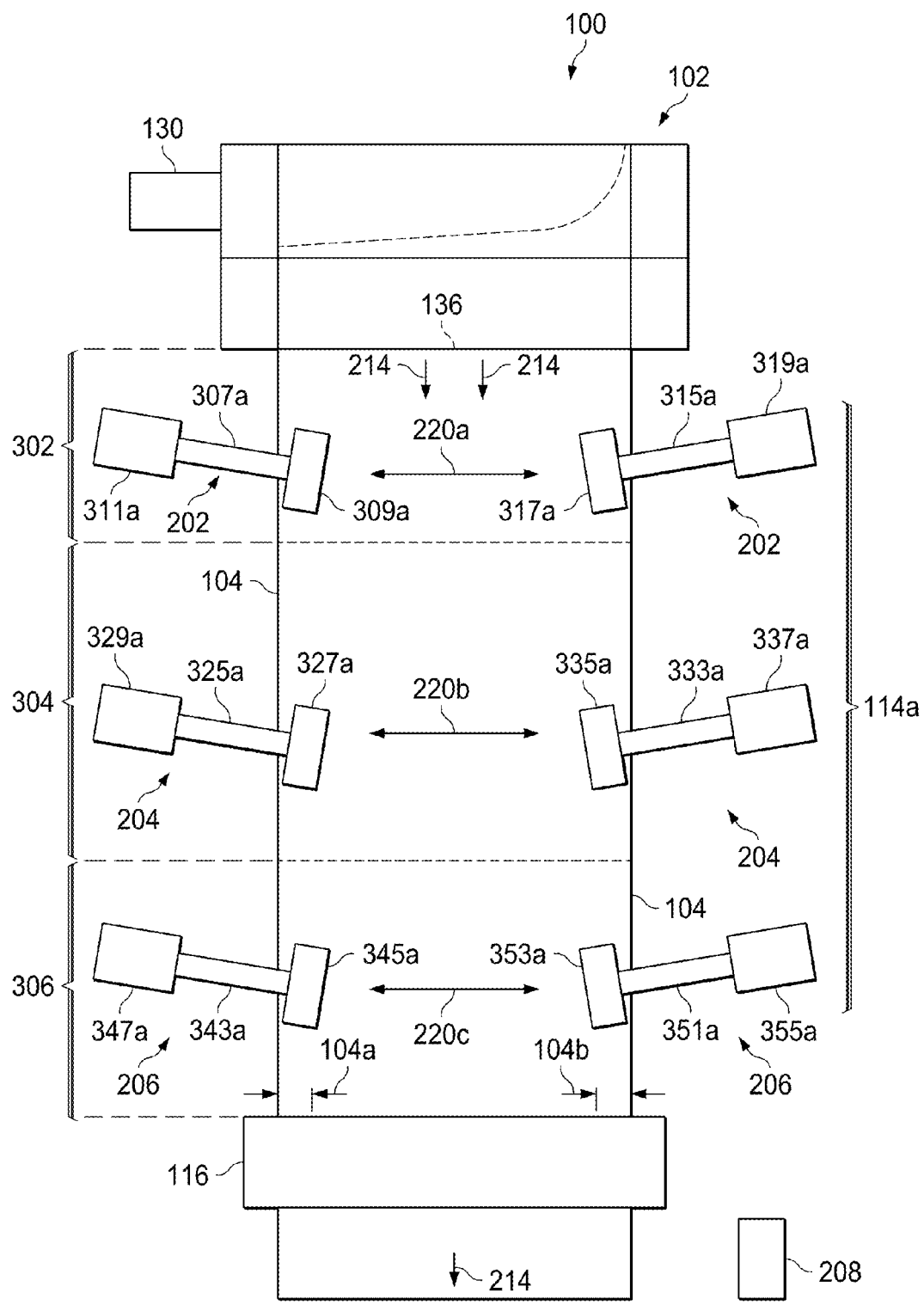

Referring to FIGS. 3A-3F, there are various schematics of the forming device 102 and the pull roll device 114a and 114b in accordance with several examples of the disclosure. As shown in FIGS. 3A-3B, the pull roll device 114a operates to draw the glass ribbon 104 from the root 136 of the forming device 102 into a viscous zone 302 wherein the glass ribbon 104 begins thinning to a final thickness. The portion of the glass ribbon 104 is then drawn from the viscous zone 302 into a setting zone 304. In the setting zone 302, the portion of the glass ribbon 104 is set from a viscous state to an elastic state with the desired profile. The setting zone 304 can be defined as the zone where the temperatures satisfy the following $$0.2 \text{ sec} < \frac{\eta(T)}{G} < 10000 \text{ sec},$$

with η being the glass viscosity (Pa·sec), T being the temperature (° C.), and G being the room temperature shear modulus (Pa) of the glass ribbon 104. The portion of the glass ribbon 104 is then drawn from the setting zone 304 to an elastic zone 306. Once in the elastic zone 306, the glass ribbon 104 may be deformed, within limits, without permanently changing the profile of the glass ribbon 104. In this example, the pull roll device 114a is configured such that the first upstream pair of draw rolls 210 and the second upstream pair of draw rolls 212 are located in the viscous zone 302, the first midstream pair of rolls 216 and the second midstream pair of rolls 218 are located in the setting zone 304, and the first downstream pair of draw rolls 222 and the second downstream pair of draw rolls 224 are located in the elastic zone 306. The separating device 116 would be located in the elastic zone 306.

Figure 3C:
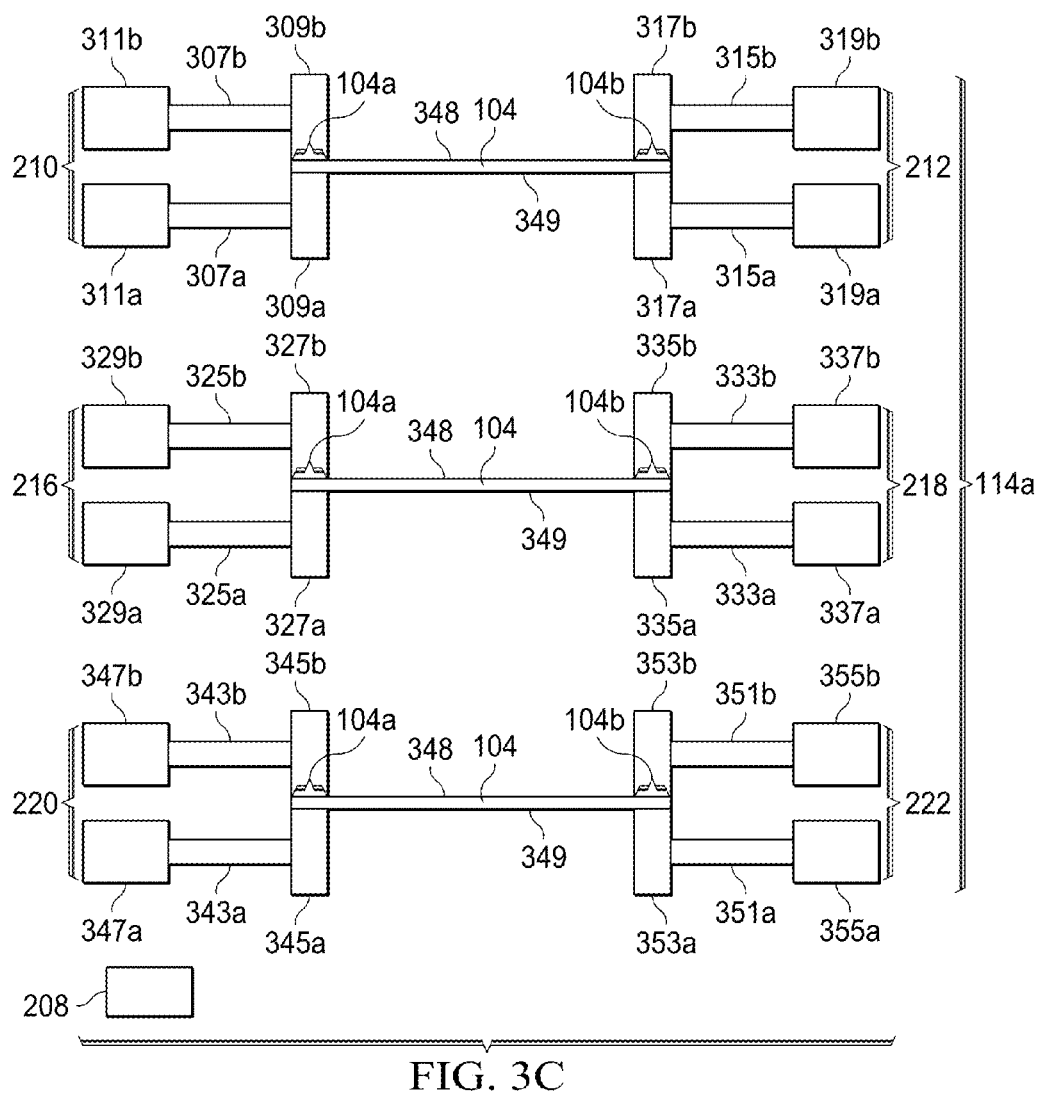

In particular FIGS. 3A-3C, illustrates a first example of the pull roll device 114a in accordance with one aspect of the disclosure although other pull roll device constructions may be provided in further examples. As shown, the pull roll device 114a can include the first roll apparatus 202 including the first upstream pair of draw rolls 210 configured to draw the first edge portion 104a of the glass ribbon 104 from the forming device 102 along the draw path 214 extending transverse to the width "W" of the glass ribbon 104.

As shown, the first upstream pair of draw rolls 210 can include a first pull roll member 307a and a second pull roll member 307b. The first and second pull roll members 307a and 307b can each be provided with a respective refractory roll covering 309a and 309b configured to engage the first edge portion 104a of the glass ribbon 104 therebetween. At least one of the first and second pull roll members 307a and 307b may be provided with a respective motor 311a and 311b. For example, as shown, both the first and second pull roll members 307a and 307b are provided with a respective motor 311a and 311b. In further examples, only one of the first and second pull roll members 307a or 307b is provided with a motor wherein the other pull roll member may be provided with a bearing such that only one of the first and second pull roll members 307a or 307b is driven.

In another example, in addition or in alternative to the first upstream pair of draw rolls 210, the first pull roll apparatus 202 can include the second upstream pair of draw rolls 212 configured to draw the second edge portion 104b of the glass ribbon 104 from the forming device 102 along the draw path 214. As shown, the second upstream pair of draw rolls 212 can include a first pull roll member 315a and a second pull roll member 315b. The first and second pull roll members 315a and 315b can each be provided with a respective refractory roll covering 317a and 317b configured to engage the second edge portion 104b of the glass ribbon 104 therebetween. At least one of the first and second pull roll members 315a and 315b may be provided with a respective motor 319a and 319b. For example, as shown, both the first and second pull roll members 315a and 315b are provided with a respective motor 319a and 319b. In further examples, only one of the first and second pull roll members 315a or 315b is provided with a motor wherein the other pull roll member may be provided with a bearing such that only one of the first and second pull roll members 315a or 315b is driven.

The pull roll device 114a further includes a second roll apparatus 204 which includes the first midstream pair of rolls 216 positioned downstream along the draw path 214 from the first upstream pair of draw rolls 210. In this example, the first midstream pair of rolls 216 are vertically down-tilted and configured to apply a lateral tension 220b (cross tension 220b) to the first edge 104a of the glass ribbon 104. As shown, the first midstream pair of rolls 216 can include a first roll member 325a and a second roll member 325b. The first and second roll members 325a and 325b can each be provided with a respective refractory roll covering 327a and 327b configured to engage the first edge portion 104a of the glass ribbon 104 therebetween. At least one of the first and second roll members 325a and 325b may be provided with a respective motor 329a and 329b. For example, as shown, both the first and second roll members 325a and 325b are provided with a respective motor 329a and 329b. In further examples, only one of the first and second roll members 325a or 325b is provided with a motor wherein the other pull roll member may be provided with a bearing such that only one of the first and second roll members 325a or 325b is driven. In some examples, the first midstream pair of rolls 216 is not driven by a motor but instead idle so as to freely rotate when the first edge 104a of the glass ribbon 104 passes therebetween.

In another example, in addition or in alternative to the first midstream pair of rolls 216, the second roll apparatus 204 can include a second midstream pair of rolls 218 positioned downstream along the draw path 214 from the second upstream pair of draw rolls 212. In this example, the second midstream pair of rolls 216 are vertically down-tilted and configured to apply a lateral tension 220b (cross tension 220b) to the second edge 104b of the glass ribbon 104. As shown, second midstream pair of rolls 216 can include a first roll member 333a and a second roll member 333b. The first and second roll members 333a and 333b can each be provided with a respective refractory roll covering 335a and 335b configured to engage the second edge portion 104b of the glass ribbon 104 therebetween. At least one of the first and second roll members 333a and 333b may be provided with a respective motor 337a and 337b. For example, as shown, both the first and second roll members 333a and 333b are provided with a respective motor 337a and 337b. In further examples, only one of the first and second roll members 333a or 333b is provided with a motor wherein the other roll member may be provided with a bearing such that only one of the first and second roll members 333a or 333b is driven. In some examples, the second midstream pair of rolls 218 is not driven by a motor but instead idle so as to freely rotate when the second edge 104b of the glass ribbon 104 passes therebetween.

The pull roll device 114a further includes a third roll apparatus 206 including a first downstream pair of draw rolls 220 positioned downstream along the draw path 214 from the first midstream pair of rolls 216. The first downstream pair of draw rolls 220 are configured to further draw the first edge portion 104a of the glass ribbon 104 along the draw path 214. As shown, the first downstream pair of draw rolls 220 can include a first pull roll member 343a and a second pull roll member 343b. The first and second pull roll members 343a and 343b can each be provided with a respective refractory roll covering 345a and 345b configured to engage the first edge portion 104a of the glass ribbon 104 therebetween. At least one of the first and second pull roll members 343a and 343b may be provided with a respective motor 347a and 347b. For example, as shown, both the first and second pull roll members 343a and 343b are provided with a respective motor 347a and 347b. In further examples, only one of the first and second pull roll members 343a or 343b is provided with a motor wherein the other pull roll member may be provided with a bearing such that only one of the first and second pull roll members 343a or 343b is driven.

In another example, in addition or in alternative to the first downstream pair of draw rolls 220, the third roll apparatus 206 can include a second downstream pair of draw rolls 222 positioned downstream along the draw path 214 from the second midstream pair of rolls 218. The second downstream pair of draw rolls 222 are configured to further draw the second edge portion 104b of the glass ribbon 104 along the draw path 214. As shown, the second downstream pair of draw rolls 222 can include a first pull roll member 351a and a second pull roll member 351b. The first and second pull roll members 351a and 351b can each be provided with a respective refractory roll covering 353a and 353b configured to engage the second edge portion 104b of the glass ribbon 104 therebetween. At least one of the first and second pull roll members 351a and 351b may be provided with a respective motor 355a and 355b. For example, as shown, both the first and second pull roll members 351a and 351b are provided with a respective motor 355a and 355b. In further examples, only one of the first and second pull roll members 351a or 351b is provided with a motor wherein the other pull roll member may be provided with a bearing such that only one of the first and second pull roll members 351a or 351b is driven.

The pull roll device 114a of the glass manufacturing apparatus 100 can further include a control device 208 (e.g., programmable logic controller 208, processor-memory 208) configured to at least independently operate the first roll apparatus 202 and the third pull roll apparatus 206 such that at least one of the first upstream pair of draw rolls 210 rotates with a substantially constant torque and at least one of the first downstream pair of draw rolls 220 rotates with a substantially constant angular velocity. Independent operation of the first and third roll apparatuses 202 and 206, for purposes of this disclosure, means that one of the first and third roll apparatuses 202 or 206 may be operated without being affected by operation of the other of the first and third pull roll apparatuses 202 or 206. As such, for example, independently operating the first pull roll apparatus 202 with the control device 208 provides for the control device 208 to operate the first pull roll apparatus 202 without considering changes in operating parameters of the third pull roll apparatus 206.

As mentioned previously, the first upstream pair of draw rolls 210 can include a single motor associated with one of the first or second pull roll members 307a or 307b. In such an example, the control device 208 can operate the single motor such that the associated first or second pull roll members 307a or 307b rotate with a substantially constant torque. As further described above, each of the first and second pull roll members 307a and 307b may be provided with a corresponding motor 311a and 311b. In such examples, the control device 208 may operate the motors 311a and 311b such that both of the first upstream pair of draw rolls 210 rotate with a substantially constant torque. Rotating both pull roll members 307a and 307b of the first upstream pair of draw rolls 210 with a substantially constant torque may be desirable to apply force equally at both sides of the first edge portion 104a of the glass ribbon 104.

As mentioned previously, the first roll apparatus 202 may also include an optional second upstream pair of draw rolls 212. In such examples, the second upstream pair of draw rolls 212 can include a single motor associated with one of the first or second pull roll members 315a or 315b. In such an example, the control device 208 can operate the single motor such that the associated first or second pull roll members 315a or 315b rotate with a substantially constant torque. As further described above, each of the first and second pull roll members 315a and 315b may be provided with a corresponding motor 319a and 319b. In such examples, the control device 208 may operate the motors 319a and 319b such that both of the second upstream pair of draw rolls 212 rotate with a substantially constant torque. Rotating both pull roll members 315a and 315b of the second upstream pair of draw rolls 212 with a substantially constant torque may be desirable to apply force equally at both sides of the second edge portion 104b of the glass ribbon 104.

Although not required, in some examples, the control device 208 can operate one or both of the motors 311a and 311b associated with the first upstream pair of draw rolls 210 with a substantially constant first torque and can simultaneously operate one or both of the motors 319a and 319b associated with the second upstream pair of draw rolls 212 to rotate with a substantially constant second torque that is substantially equal to the first torque. Providing substantially equal first and second torques can be desired, for example, to apply substantially the same force to the glass ribbon 104 and the first and second edge portions 104a and 104b.

As mentioned previously, the first downstream pair of draw rolls 220 can include a single motor associated with one of the first or second roll members 343a or 343b. In such an example, the control device 208 can operate the single motor such that the associated first or second pull roll members 343a or 343b rotate with a substantially constant angular velocity. As further described above, each of the first and second pull roll members 343a and 343b may be provided with a corresponding motor 347a and 347b. In such examples, the control device 208 may operate the motors 347a and 347b such that at least one, such as both, of the first downstream pair of draw rolls 220 rotate with a substantially constant angular velocity. Rotating both pull roll members 343a and 343b of the first downstream pair of draw rolls 220 with a substantially constant angular velocity may be desirable to draw the glass ribbon equally at both sides of the first edge portion 104a of the glass ribbon 104.

As mentioned previously, the third roll apparatus 206 may also include an optional second downstream pair of draw rolls 222. In such examples, the second downstream pair of draw rolls 222 can include a single motor associated with one of the first or second pull roll members 351a or 351b. In such an example, the control device 208 can operate the single motor such that the associated first or second pull roll members 351a or 351b rotate with a substantially constant angular velocity. As further described above, each of the first and second pull roll members 351a and 351b may be provided with a corresponding motor 355a and 355b. In such examples, the control device 208 may operate such that both of the second downstream pair of draw rolls 222 rotate with a substantially constant angular velocity. Rotating both pull roll members 351a and 351b of the second downstream pair of draw rolls 222 with a substantially constant angular velocity may be desirable to draw the glass ribbon 104 equally at both sides of the second edge portion 104b of the glass ribbon 104.

Although not required, in some examples, the control device 208 can operate one or both of the motors 347a and 347b associated with the first downstream pair of draw rolls 220 with a substantially constant first angular velocity and can simultaneously operate one or both of the motors 355a and 355b associated with the second downstream pair of draw rolls 222 to rotate with a substantially constant second angular velocity that is substantially equal to the first angular velocity. Providing substantially equal first and second angular velocities can be desired, for example, to draw the glass ribbon equally at the first and second edge portions 104a and 104b. Generally, the first and second angular velocities are regulated to keep the glass ribbon 104 tracking straight and to maintain a desired thickness. If the first and second angular velocities are substantially different, then the glass ribbon 104 curves off to one side. However, the first and second angular velocities are not exactly the same, since there are small differences in stretching between the two sides of the glass ribbon 104.

Furthermore, the control device 208 (e.g., programmable logic controller 208, processor-memory 208) can be configured to operate the first roll apparatus 202, the second roll apparatus 204, and the third pull roll apparatus 206. In this case, the second roll apparatus 204 would be configured such that one or both of the first and second midstream pair of rolls 216 and 218 would be driven by one or more motors 329a, 329b, 337a and 337b. If desired, the control device 208 could be configured to independently operate the second roll apparatus 204 such that one or more of the rolls 325a, 325b, 333a and 333b would rotate at either a substantially constant torque or a substantially constant angular velocity. Alternatively, the control device 208 can be configured to operate the second roll apparatus 204 dependent on the operating parameters of one or both of the first roll apparatus 202 and the third roll apparatus 206.

As described above, at least the first roll apparatus 202 and the third roll apparatus 206 includes at least one motor. The second roll apparatus 204 may or may not have at least one motor. The motors can comprise servo motors that may optionally be provided with a gear box to drive the respective rolls. The servo motors, if provided, can provide torque and/or angular velocity measurements back to the control device 208 (e.g., programmable logic controller 208, processor-memory 208) that may then be used by the control device 208 to implement the desired control scheme. Alternatively, the control device 208 may interact with other types of motor controllers such as variable frequency drives to control the angular velocity and/or torque of the respective motors. In this example, torque sensors and/or angular velocity sensors may be used to sense operating conditions and provide feedback of the sensed conditions to the control device 208.

Figure 3D:
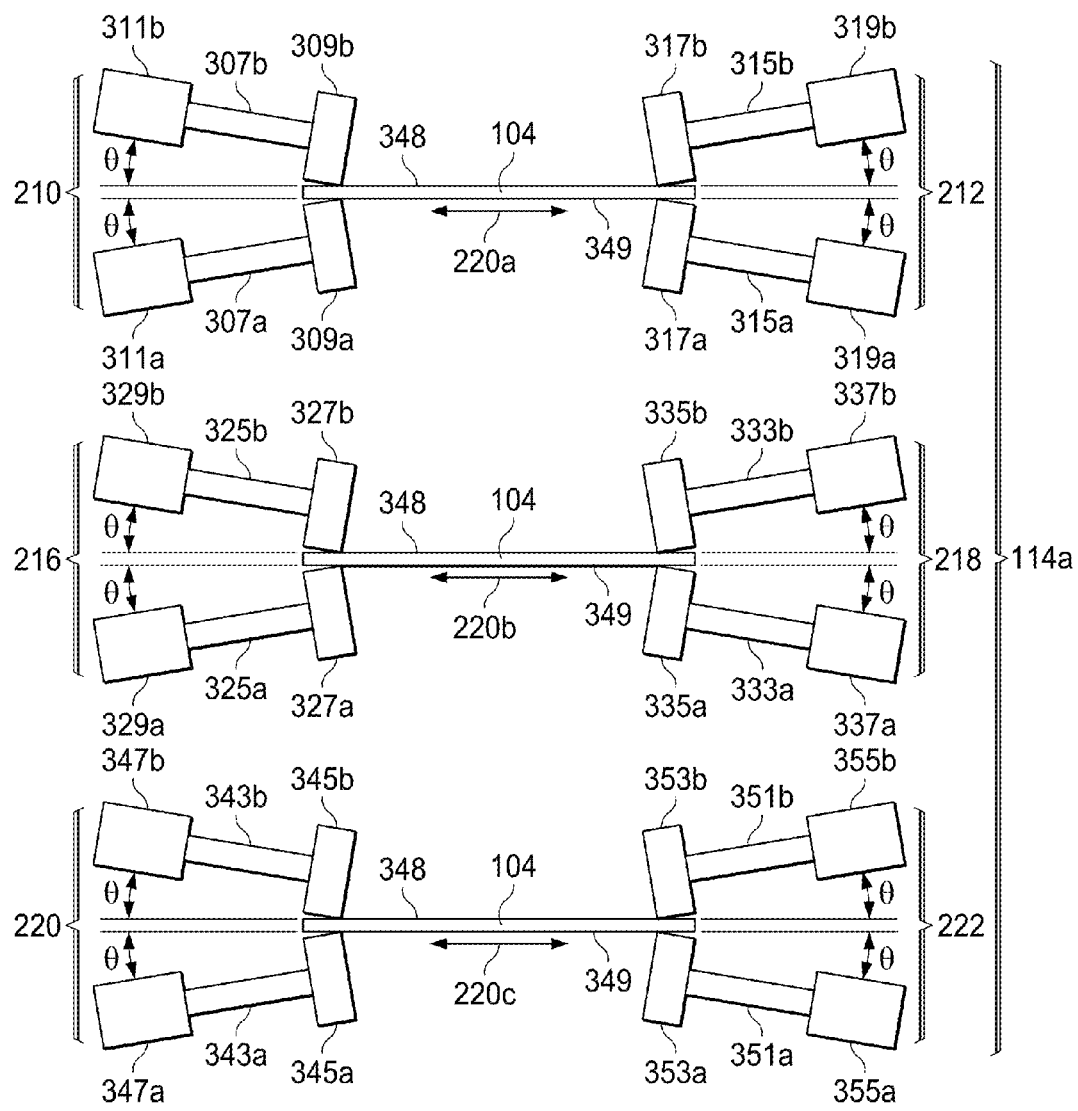

In some examples, the pairs of rolls 210, 212, 216, 218, 220 and 222 discussed throughout the application may have similar constructions and orientations as set forth in the co-assigned U.S. Patent Application Publication No. 2009/0107182 that was published on Apr. 30, 2009 to Anderson et al., which is herein incorporated by reference in its entirety. For example, any of the pairs of rolls 210, 212, 216, 218, 220 and 222 may be vertically down-tilted or horizontally level rolls with respect to the glass ribbon 104. Moreover, as shown in FIG. 3D, any of the pairs of rolls 210, 212, 216, 218, 220 and 222 (either horizontally level or vertically down-tilted) may be positioned to have a predetermined horizontal angle θ where the respective faces 309a, 309b, 317a, 317b, 327a, 327b, 335a, 335b, 345a, 345b, 353a and 353b of the rolls 210, 212, 216, 218, 220 and 222 would be positioned relative to a respective major surface 348 and 349 of the glass ribbon 104. The horizontal angle θ can be desirable to help control and provide an appropriate level of cross-draw tension 220a, 220b and 220c and/or accommodate a taper effect that may occur during normal roll wear. In contrast, FIG. 3C illustrates top views of the pairs of rolls 210, 212, 216, 218, 220 and 222 which do not have a predetermined horizontal angle θ but instead the respective faces 309a, 309b, 317a, 317b, 327a, 327b, 335a, 335b, 345a, 345b, 353a and 353b of the rolls 210, 212, 216, 218, 220 and 222 would be positioned so as to fully contact the major surface 348 and 349 of the glass ribbon 104.

FIGS. 3A-3B illustrates an example where each of the first and second upstream pair of draw rolls 210 and 212, the first and second midstream pair of rolls 216 and 218, and the first and second downstream pair of draw rolls 220 and 222 all comprise vertically down-tilted rolls with respect to the glass ribbon 104. The down-tilt angle of any pair of the draw rolls may be different or the same as any other pair of draw rolls depending on process considerations. Down-tilting of the first and/or second upstream pair of draw rolls 210 and 212 can provide a desired level of cross-draw tension 220a in the glass ribbon 104 between the two pairs of draw rolls 210 and 212. The down-tilting of the first and the second midstream pair of vertically down-tilted rolls 216 and 218 can provide a desired level of cross-draw tension 220b in the glass ribbon 104 between the two pairs of draw rolls 216 and 218. Likewise, down-tilting the first and/or second downstream pair of draw rolls 220 and 222 can provide a desired level of cross-draw tension 220c in the glass ribbon 104 between the two pairs of draw rolls 220 and 222.

In some examples, the control device 208 may be configured to activate an automatic positioner (not shown) or a manual mechanism may be used to adjust the down-tilt position of the rolls 210, 212, 216, 218, 220 and 222 so as to control (or tune) the average cross-draw tension 220a, 220b and 220c across the glass ribbon 104.

In further examples, one or more of the pairs of draw rolls 210, 212, 220 and 222 may be horizontally level rolls instead of vertically down-tilted rolls with respect to the glass ribbon 104. For example, FIGS. 3E and 3F respectively show a front view and a several top views of the pull roll device 114b including pairs of draw rolls 210', 212', 216', 218', 220' and 222' that are horizontally level with respect to the glass ribbon 104 wherein the rotation axis extends substantially perpendicular to the draw path 214 of the glass ribbon 104. Providing one or more of the pairs of rolls 210', 212', 216', 218', 220' and 222' of the pull roll device 114b as horizontally level rolls may be desired if cross-wise tension is not necessary across the width "W" of the glass ribbon 104 along the pairs of rolls 210', 212', 216', 218', 220' and 222'. In practice, it should be appreciated that the horizontal rollers 210', 212', 216', 218', 220' and 222' would still generate a small amount of cross-tension 220a, 220b, and 220c even when they are not vertically tilted.

Figure 3E:
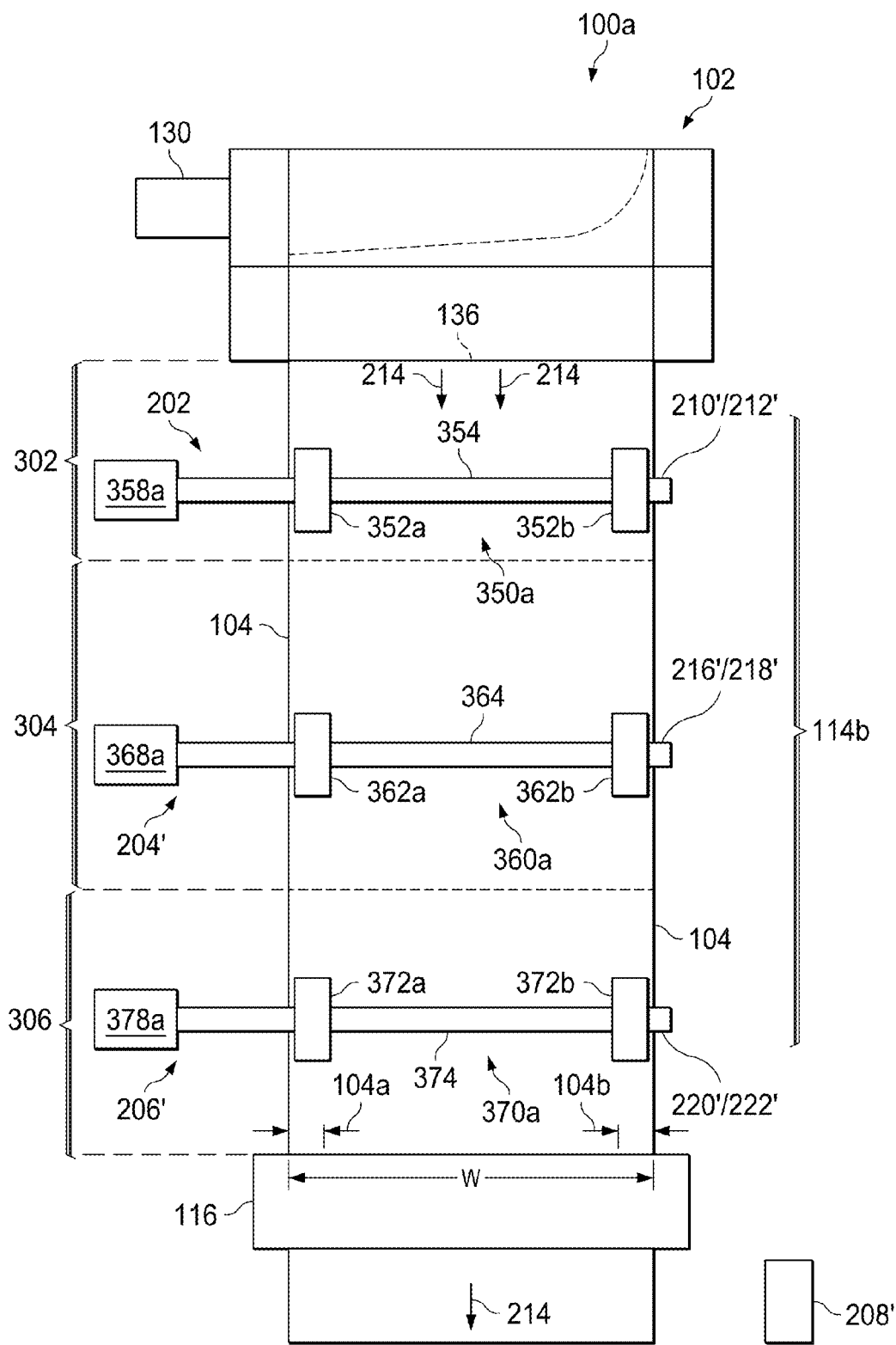
Figure 3F:
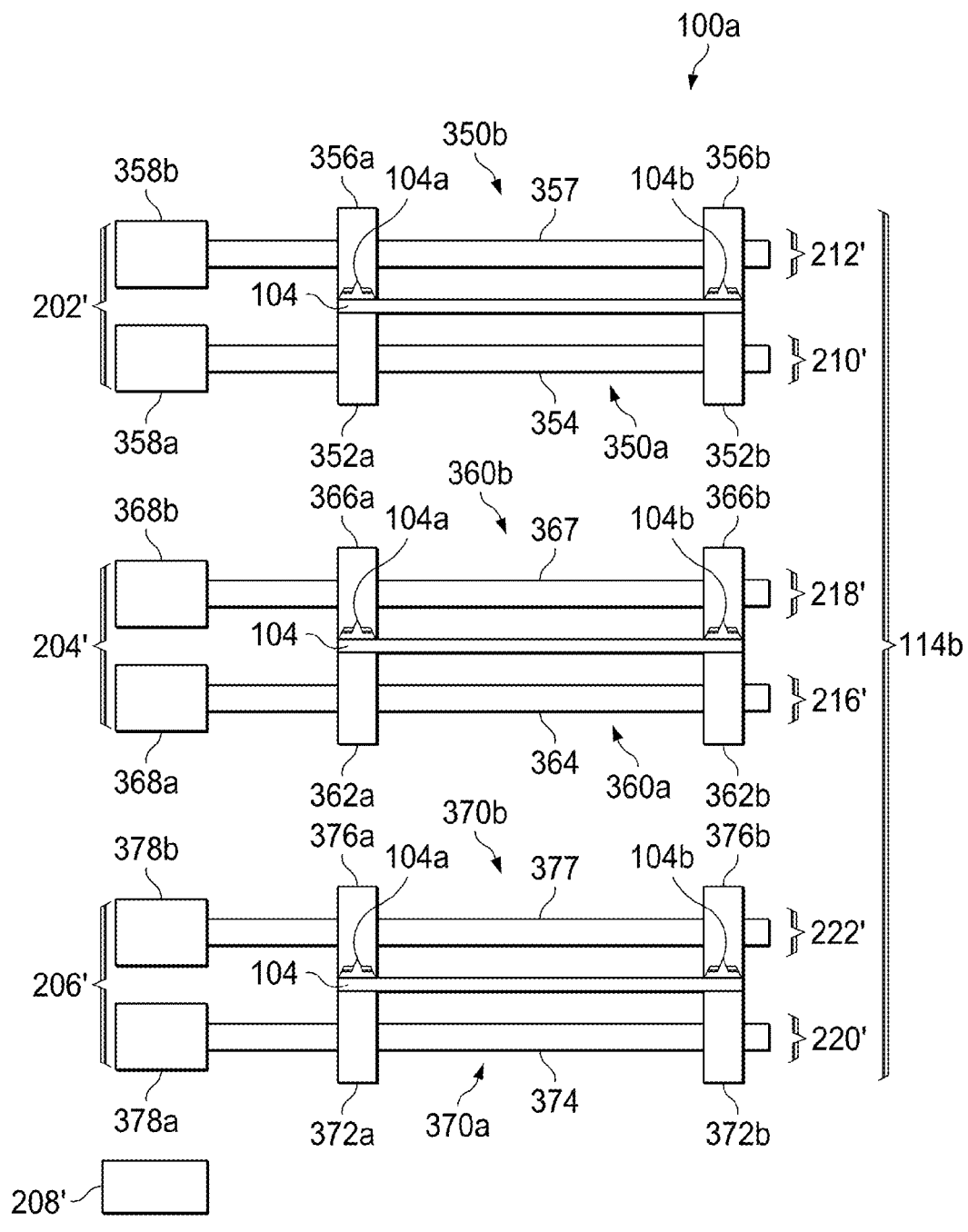

In particular, FIGS. 3E and 3F, illustrate another example glass manufacturing apparatus 100a including the pull roll device 114b with a first roll apparatus 202' (which in this particular application is located in the viscosity zone 302) including an upstream pair of draw rolls 210' and 212' respectively including a first pull roll member 350a and a second pull roll member 350b. The first pull roll member 350a can include a first and second refractory roll covering 352a and 352b coupled to a first upper shank 354. Likewise, the second pull roll member 350b can include a first and second refractory roll covering 356a and 356b coupled to a second upper shank 357. The first refractory roll coverings 352a and 356a are configured to engage and draw the first edge portion 104a of the glass ribbon 104 therebetween. Likewise, the second refractory roll coverings 352b and 356b are configured to engage and draw the second edge portion 104b of the glass ribbon 104 therebetween.

At least one of the first and second pull roll members 350a and 350b may be provided with a respective motor 358a and 358b. For example, as shown, both the first and second pull roll members 350a and 350b are provided with a respective motor 358a and 358b. The motor 358a can rotate the first upper shank 354 together with the first and second refractory roll coverings 352a and 352b coupled to the first upper shank 354. Likewise, the motor 358b can rotate the second upper shank 357 together with the first and second refractory roll coverings 356a and 356b coupled to the second upper shank 357. In further examples, only one of the first and second pull roll members 350a or 350b is provided with a motor wherein the other pull roll member may be provided with a bearing such that only one of the first and second pull roll members 350a or 350b is driven.

The pull roll device 114b further includes a second roll apparatus 204' (which in this particular application is located in the setting zone 304) including a midstream pair of rolls 210' and 212' respectively including a first pull roll member 360a and a second pull roll member 360b which are positioned downstream along the draw path 214 from the first upstream pair of draw rolls 210' and 212'. The first pull roll member 360a can include a first and second refractory roll covering 362a and 362b coupled to a first midstream shank 364. Likewise, the second pull roll member 360b can include a first and second refractory roll covering 366a and 366b coupled to a second midstream shank 367. The first refractory roll coverings 362a and 366a are configured to at least engage the first edge portion 104a of the glass ribbon 104 therebetween. Likewise, the second refractory roll coverings 362b and 366b are configured to at least engage the second edge portion 104b of the glass ribbon 104 thereby between.

If desired, at least one of the first and second pull roll members 360a and 360b may be provided with a respective motor 368a and 368b. For example, as shown, both the first and second pull roll members 360a and 360b are provided with a respective motor 368a and 368b. The motor 368a can rotate the first midstream shank 364 together with the first and second refractory roll coverings 362a and 362b coupled to the first midstream shank 364. Likewise, the motor 368b can rotate the second midstream shank 367 together with the first and second refractory roll coverings 366a and 366b coupled to the second midstream shank 367. In further examples, only one of the first and second pull roll members 360a or 360b is provided with a motor wherein the other pull roll member may be provided with a bearing such that only one of the first and second pull roll members 360a or 360b is driven. In another example, the first and second pull roll members 360a or 360b would not have a motor or motors driving them but instead would rotate (or idle) freely with the downward moving glass ribbon 104.

The pull roll device 114b further includes a third roll apparatus 206' (which in this particular application is located in the elasticity zone 306) including a downstream pair of draw rolls 220' and 222' respectively including a first pull roll member 370a and a second pull roll member 370b positioned downstream along the draw path 214 from the midstream pair of rolls 216' and 218'. The first pull roll member 370a can include a first and second refractory roll covering 372a and 372b coupled to a first upper shank 374. Likewise, the second pull roll member 370b can include a first and second refractory roll covering 376a and 376b coupled to a second upper shank 377. The first refractory roll coverings 372a and 376a are configured to engage the first edge portion 104a of the glass ribbon 104 therebetween. Likewise, the second refractory roll coverings 372b and 376b are configured to engage the second edge portion 104b of the glass ribbon 104 therebetween.

At least one of the first and second pull roll members 370a and 370b may be provided with a respective motor 378a and 378b. For example, as shown, both the first and second pull roll members 370a and 370b are provided with a respective motor 378a and 378b. The motor 378a can rotate the first upper shank 374 together with the first and second refractory roll coverings 372a and 372b coupled to the first upper shank 374. Likewise, the motor 378b can rotate the second upper shank 377 together with the first and second refractory roll coverings 376a and 376b coupled to the second upper shank 377. In further examples, only one of the first and second pull roll members 370a or 370b is provided with a motor wherein the other pull roll member may be provided with a bearing such that only one of the first and second pull roll members 370a or 370b is driven.

As shown in FIGS. 3E and 3F, the glass manufacturing apparatus 100a can further include a control device 208' (e.g., programmable logic controller 208', processor-memory 208') configured at least to independently operate the first roll apparatus 202', and the third roll apparatus 206' such that at least one of the first upstream pair of draw rolls 210' and 212' rotates with a substantially constant torque and at least one of the first downstream pair of draw rolls 220' and 222' rotates with a substantially constant angular velocity. Furthermore, the control device 208' can be configured to independently operate the second roll apparatus 204' such that at least one of the midstream pair of rolls 216' and 218' would rotate with either a substantially constant torque or a substantially constant angular velocity. Alternatively, the control device 208' can be configured to operate the second roll apparatus 204' dependent on the operating parameters of one or both of the first roll apparatus 202' and the third roll apparatus 206'. In yet another alternative, the control device 208' can be configured to monitor the rotation of the midstream pair of rolls 216' and 218' which do not have a motor or motors driving them but instead would be configured to rotate (or idle) freely with the glass ribbon 104.

As described above, at least the first roll apparatus 202' and the third roll apparatus 206' includes at least one motor. The second roll apparatus 204' may or may not have at least one motor. The motors can comprise servo motors that may optionally be provided with a gear box to drive the respective rolls. The servo motors, if provided, can provide torque and/or angular velocity measurements back to the control device 208' (e.g., programmable logic controller 208', processor-memory 208') that may then be used by the control device 208' to implement the desired control scheme. Alternatively, the control device 208' may interact with other types of motor controllers such as variable frequency drives to control the angular velocity and/or torque of the respective motors. In this case, torque sensors and/or angular velocity sensors may be used to sense operating conditions and provide feedback of the sensed conditions to the control device 208'.

Figure 4A:
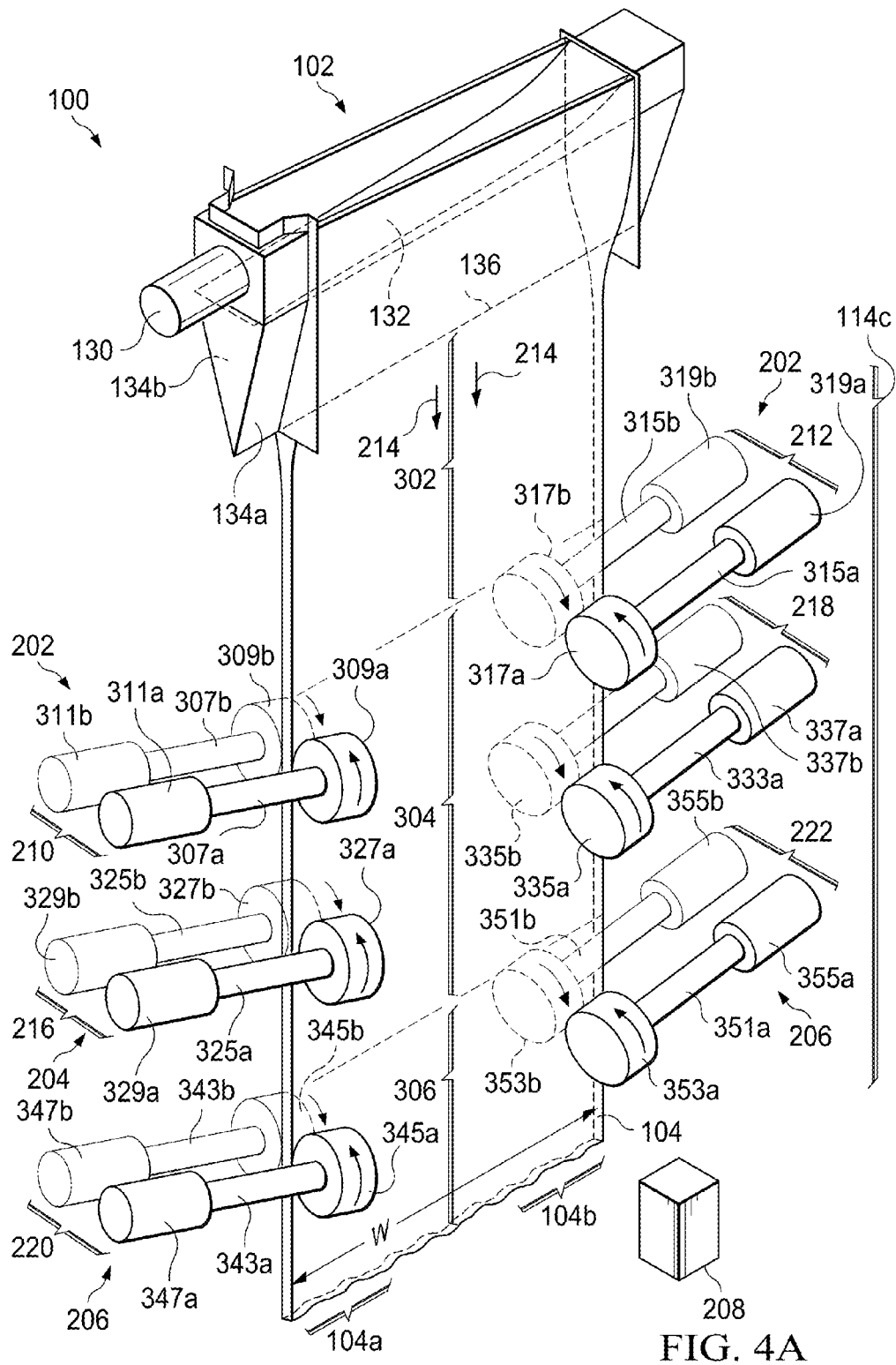
FIGS. 4A-4C are views of portions of the glass manufacturing apparatus of FIG. 1 illustrating different exemplary pull roll devices where each exemplary pull roll device includes a first roll apparatus located in a setting zone, a second roll apparatus located in a setting zone, and a third roll apparatus located in an elastic zone in accordance with an example of the disclosure.
Figure 4B:
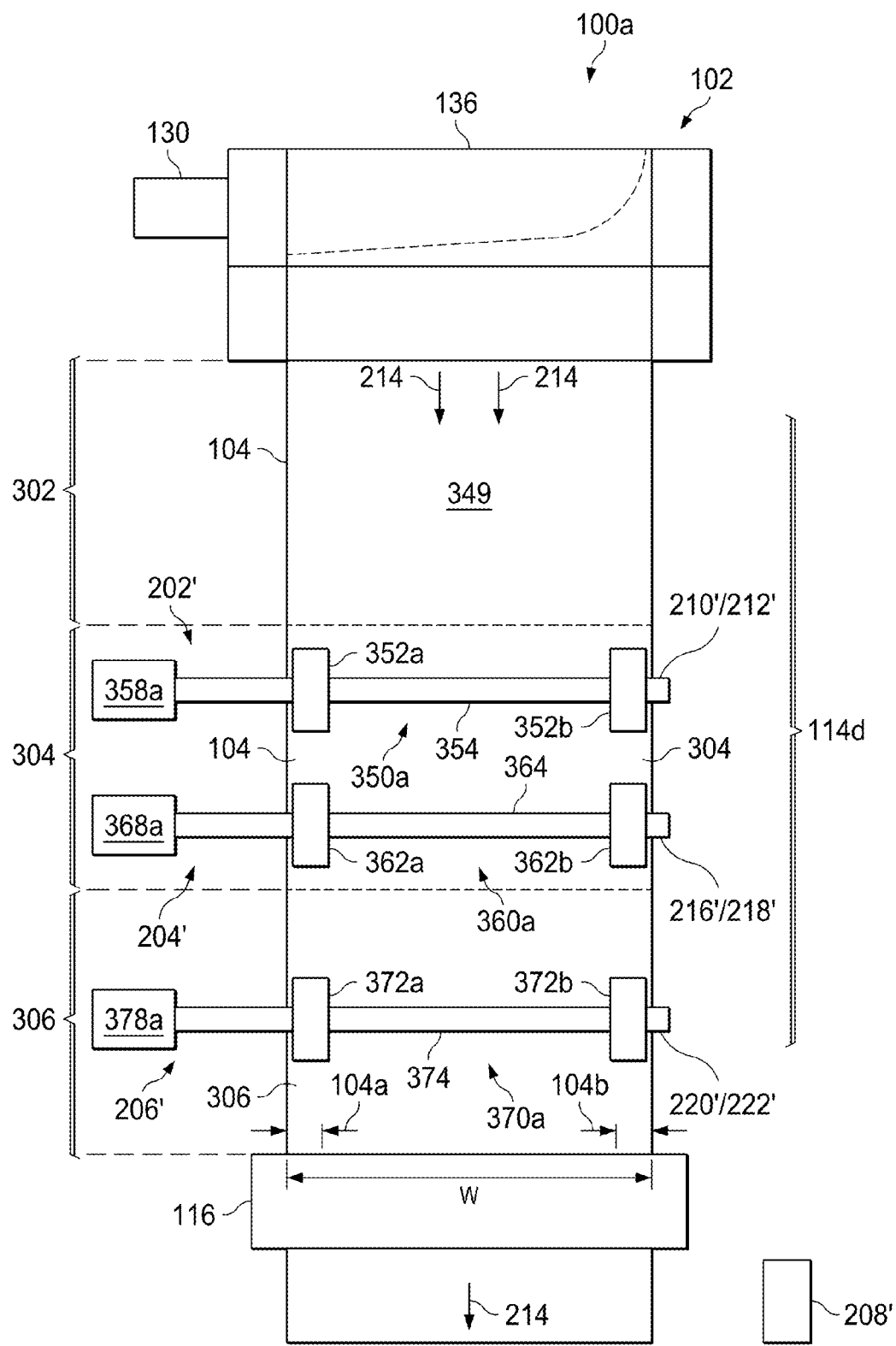
Figure 4C:
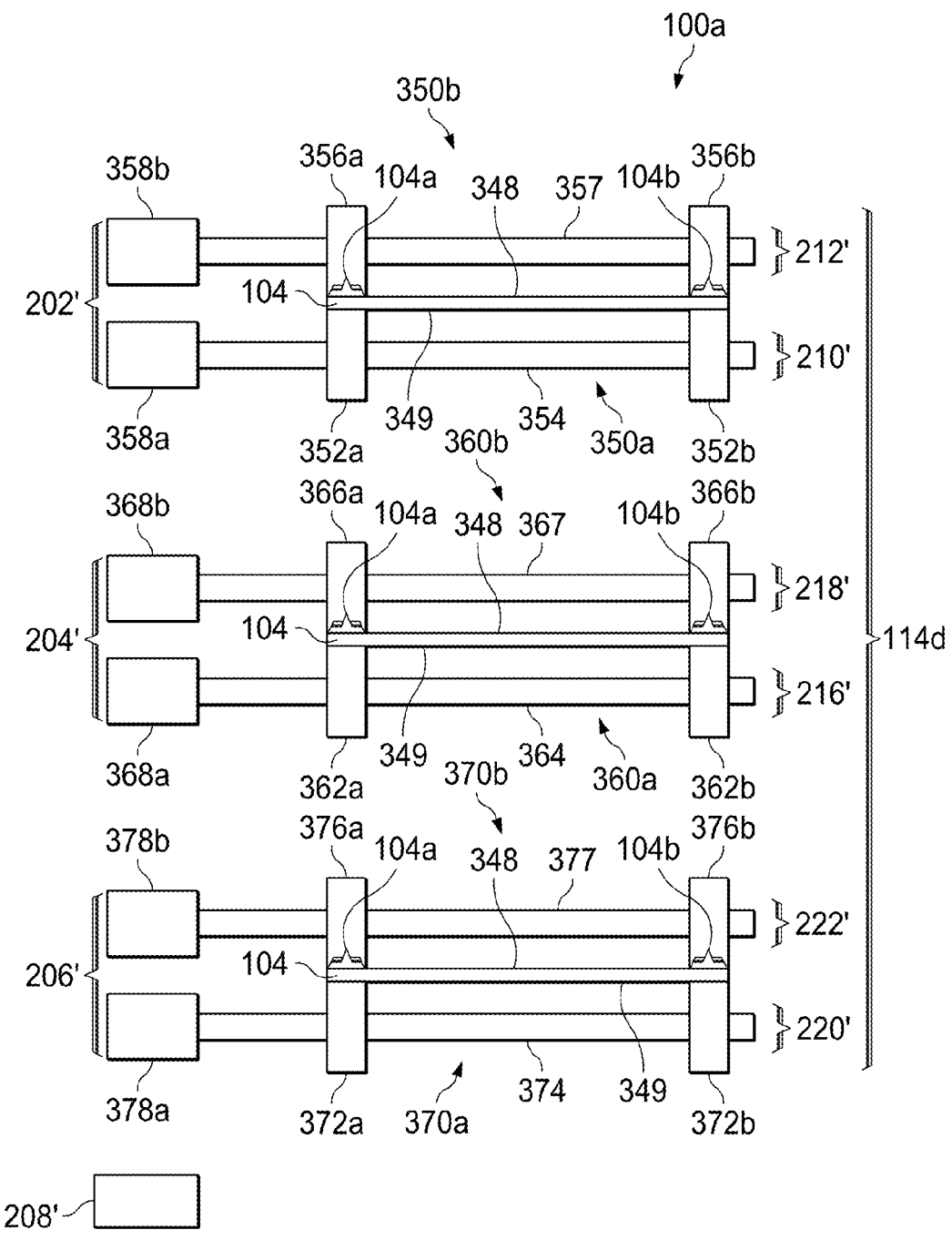

Referring to FIGS. 4A-4C, there are schematics of the forming device 102 and the pull roll device 114c and 114d in accordance with several examples of the disclosure. As shown in FIG. 4A, the pull roll device 114c includes a first roll apparatus 202, a second roll apparatus 204, a third roll apparatus 206, and a control device 208 (e.g., programmable logic controller 208, processor-memory 208). In fact, the pull roll device 114c has the same structure as the aforementioned pull roll device 114a except in this example the first roll apparatus 202 and the second roll apparatus 204 are both located in the setting zone 304, and the third roll apparatus 206 is located in the elastic zone 306. As shown, the first roll apparatus 202 includes a first upstream pair of draw rolls 210 and a second upstream pair of draw rolls 212 configured to respectively draw the first edge portion 104a and the second edge portion 104b of the glass ribbon 104 from the forming device 102 along a draw path 214 extending transverse to the width "W" of the glass ribbon 104 (note: the draw rolls 210 and 212 are shown as being vertically down-tilted rolls 210 and 212 and applying a cross-tension 220a in the glass ribbon 104 but they could have a horizontal orientation and if they have a horizontal orientation then they could be connected to one another). The second roll apparatus 204 includes a first midstream pair of rolls 216 and a second midstream pair of rolls 218 which are respectively positioned downstream along the draw path 214 from the first upstream pair of draw rolls 210 and the second upstream pair of draw rolls 212 (note: the rolls 216 and 218 are shown as being vertically down-tilted rolls 216 and 218 applying a cross-tension 220b in the glass ribbon 104 but they could have a horizontal orientation and if they have a horizontal orientation then they could be connected to one another). The third roll apparatus 206 includes a first downstream pair of draw rolls 222 and a second downstream pair of draw rolls 224 which are respectively positioned downstream along the draw path 214 from the first midstream pair of rolls 216 and the second midstream pair of rolls 218 (note: the draw rolls 222 and 224 are shown as being vertically down-tilted rolls 222 and 224 and applying a cross-tension 220c in the glass ribbon 104 but they could have a horizontal orientation and if they have a horizontal orientation then they could be connected to one another)(see FIGS. 3A-3C for more details about the components associated with the first roll apparatus 202, the second roll apparatus 204, and the third roll apparatus 206). The control device 208 is configured at least to independently operate the first roll apparatus 202 and the third roll apparatus 206 such that at least one of the first upstream pair of draw rolls 210 rotates with a substantially constant torque and at least one of the first downstream pair of draw rolls 222 rotates with a substantially constant angular velocity.

As shown in FIGS. 4B-4C, the pull roll device 114d includes a first roll apparatus 202', a second roll apparatus 204', a third roll apparatus 206', and a control device 208' (e.g., programmable logic controller 208', processor-memory 208'). In fact, the pull roll device 114d has the same structure as the aforementioned pull roll device 114b except in this example the first roll apparatus 202' and the second roll apparatus 204' are both located in the setting zone 304, and the third roll apparatus 206' is located in the elastic zone 306. As shown, the first roll apparatus 202' includes the first upstream roll 210' (including refractory roll covering 352a and 352b) which is located on one major side 349 of the glass ribbon 104 and a second upstream roll 212' (including refractory roll covering 356a and 356b) which is located on the other major side 348 of the glass ribbon 104. The second roll apparatus 204' includes the first midstream roll 216' (including refractory roll covering 362a and 362b) which is located on one major side 349 of the glass ribbon 104 and a second midstream roll 218' (including refractory roll covering 366a and 366b) which is located on the other major side 348 of the glass ribbon 104. The third roll apparatus 206' includes the first downstream roll 220' (including refractory roll covering 372a and 372b) which is located on one major side 349 of the glass ribbon 104 and a second downstream roll 222' (including refractory roll covering 376a and 376b) which is located on the other major side 348 of the glass ribbon 104 (see FIGS. 3E-3F for more details about the components associated with the first roll apparatus 202', the second roll apparatus 204', and the third roll apparatus 206'). The control device 208' is at least configured to independently operate the first roll apparatus 202' and the third roll apparatus 206' such that at least one of the first upstream roll 210' and the second upstream roll 212' rotates with a substantially constant torque and at least one of the first downstream roll 220' and the second downstream roll 222' rotates with a substantially constant angular velocity.

Methods of manufacturing the glass ribbon 104 will now be described with respect to the pull roll device 114a illustrated in FIGS. 3A-3D with the understanding that a similar, such as an identical methods may be carried out to manufacture the glass ribbon 104 with the pull roll device 114b, 114c, and 114d illustrated in FIGS. 3E-3F and 4A-4C.

Referring to FIGS. 3A-3D, the method can include the steps of providing the first roll apparatus 202 including the first upstream pair of draw rolls 210. In another example, the first pull roll apparatus 202 may optionally be provided with a second upstream pair of draw rolls 212.

The method further includes the step of providing the second roll apparatus 204 including the first midstream pair of rolls 216 positioned downstream along the draw path 214 from the first upstream pair of draw rolls 210. In a further example, the second pull roll apparatus 204 may optionally be provided with a second midstream pair of rolls 218 positioned downstream along the draw path 214 from the second upstream pair of draw rolls 212.

The method further includes the step of providing the third roll apparatus 206 including the first downstream pair of draw rolls 220 positioned downstream along the draw path 214 from the first midstream pair of rolls 216. In a further example, the third roll apparatus 206 may optionally be provided with a second downstream pair of draw rolls 222 positioned downstream along the draw path 214 from the second midstream pair of rolls 218.

The method further includes the step of forming the glass ribbon 104 with the width "W" extending between the first edge portion 104a and the second edge portion 104b. The first roll apparatus 202 can be independently operated, for example, with the control device 208 without input from the third roll apparatus 206. For instance, the first roll apparatus 202 can be independently operated such that at least one roll of the first upstream pair of draw rolls 210 rotates with a substantially constant torque to draw the first edge portion 104a of the glass ribbon 104 along the draw path 214. In one example, the first roll apparatus 202 can be operated such that both rolls of the first upstream pair of draw rolls 210 rotate with a substantially constant torque.

The second upstream pair of draw rolls 212, if provided, can also be independently operated such that at least one roll of the second upstream pair of draw rolls 212 rotates with a substantially constant torque to draw the second edge portion 104b of the glass ribbon 104 along the draw path 214. In one example, the first roll apparatus 202 can be operated such that both rolls of the second upstream pair of draw rolls 212 rotate with a substantially constant torque. Furthermore, the first roll apparatus 202 can be operated such that both the first and second upstream pairs of draw rolls 210 and 212 rotate at the same substantially constant torque. As such, a desired downward tension in the same direction as the draw path 214 may be maintained in the glass ribbon 104 between the root 136 and the first roll apparatus 202.

The method further independently operates the second roll apparatus 204 such that at least one roll of the first midstream pair of rolls 216 rotates with a substantially constant angular velocity or substantially constant torque to further draw the first edge portion 104a of the glass ribbon 104 along the draw path 214. In one example, the method can include the step of operating the second roll apparatus 204 such that both rolls of the first midstream pair of rolls 216 rotate with a substantially constant angular velocity or a substantially constant torque. Alternatively, the method operates the first midstream pair of rolls 216 dependent on the operating parameters of one or both of the first roll apparatus 202 and the third roll apparatus 206. In yet another alternative, the method does not need to operate the first midstream pair of rolls 216 or if desired could just monitor the rotation of the first midstream pair of rolls 216' which do not have a motor or motors driving them but instead would be configured to rotate (or idle) freely with the glass ribbon 104.

The second midstream pair of draw rolls 218, if provided, can also be independently operated such that at least one roll of the second downstream pair of rolls 218 rotates with a substantially constant angular velocity or a substantially constant torque to further draw the second edge portion 104b of the glass ribbon 104 along the draw path 214. Generally, it is desirable to drive the lowest set of rolls at a constant angular velocity and the other rolls at a constant torque. However, certain transient startup or recovery situations may require other configurations. In one example, the method can include the step of operating the second midstream pair of rolls 218 such that both rolls of the second midstream pair of draw rolls 218 rotate with a substantially constant angular velocity or a substantially constant torque. As such, a desired downward tension in same direction as the draw path 214 may be maintained in the glass ribbon 104 between the first roll apparatus 202 and the second roll apparatus 204. Alternatively, the method operates the second midstream pair of rolls 218 dependent on the operating parameters of one or both of the first roll apparatus 202 and the third roll apparatus 206. In yet another alternative, the method does not need to operate the second midstream pair of rolls 218 or if desired could just monitor the rotation of the second midstream pair of rolls 218' which do not have a motor or motors driving them but instead would be configured to rotate (or idle) freely with the glass ribbon 104.

The method further independently operates the third roll apparatus 206 such that at least one roll of the first downstream pair of draw rolls 220 rotates with a substantially constant angular velocity to further draw the first edge portion 104a of the glass ribbon 104 along the draw path 214. In one example, the method can include the step of operating the third roll apparatus 206 such that both rolls of the first downstream pair of draw rolls 229 rotate with a substantially constant angular velocity.

The second downstream pair of draw rolls 222, if provided, can also be independently operated such that at least one roll of the second downstream pair of draw rolls 222 rotates with a substantially constant angular velocity to further draw the second edge portion 104b of the glass ribbon 104 along the draw path 214. In one example, the method can include the step of operating the second roll apparatus 206 such that both rolls of the second downstream pair of draw rolls 222 rotate with a substantially constant angular velocity. Furthermore, the third roll apparatus 206 can be operated such that both the first and second downstream pairs of draw rolls 220 and 222 rotate at the same substantially constant angular velocity. As such, a desired downward tension in same direction as the draw path 214 may be maintained in the glass ribbon 104 between the second roll apparatus 204 (or the first roll apparatus 202) and the third roll apparatus 206.

The method can further include the step of sequentially separating a plurality of glass sheets 140a and 140b (for example) from the glass ribbon 104 over a period of time at a location downstream along the draw path 214 from the first downstream pair of draw rolls 220 and if provided the second downstream pair of draw rolls 222. For example, as shown in FIG. 1, the separating device 116 may be periodically activated to sequentially separate a plurality of glass sheets 140a and 140b as the glass ribbon 104 is drawn from the forming device 102.

Figure 5A:
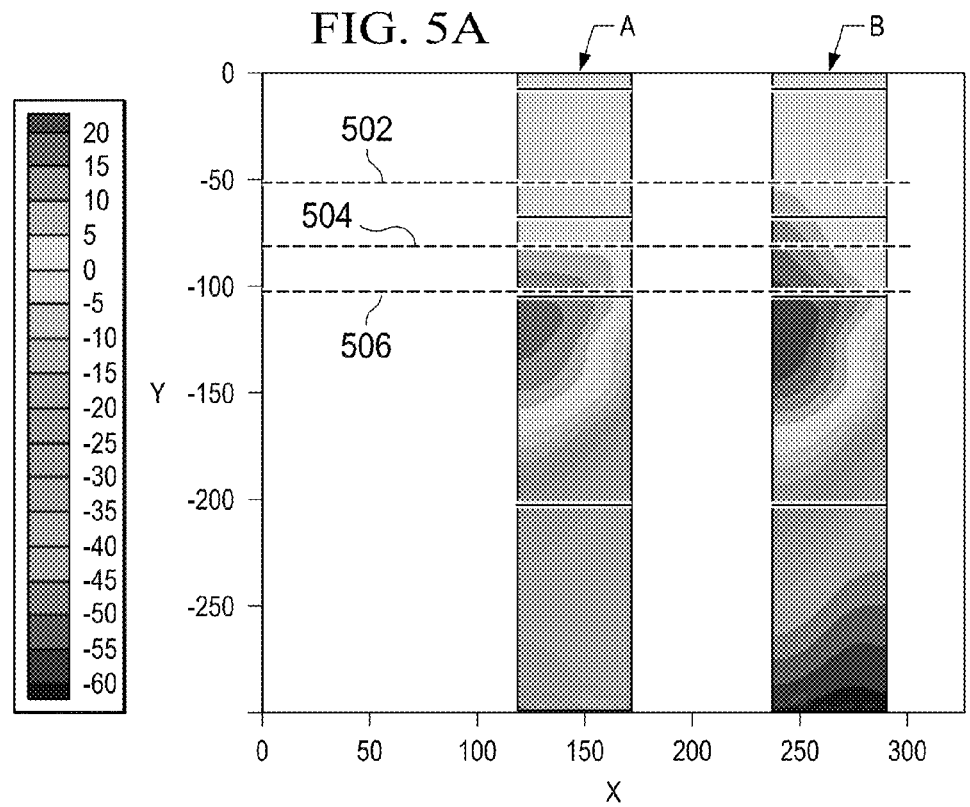
FIGS. 5A-5C, are several diagrams illustrating the experimental results of using an exemplary pull roll device shown in FIGS. 3A-3D to draw a glass ribbon from a forming device in accordance with an example of the disclosure.
Figure 5B:
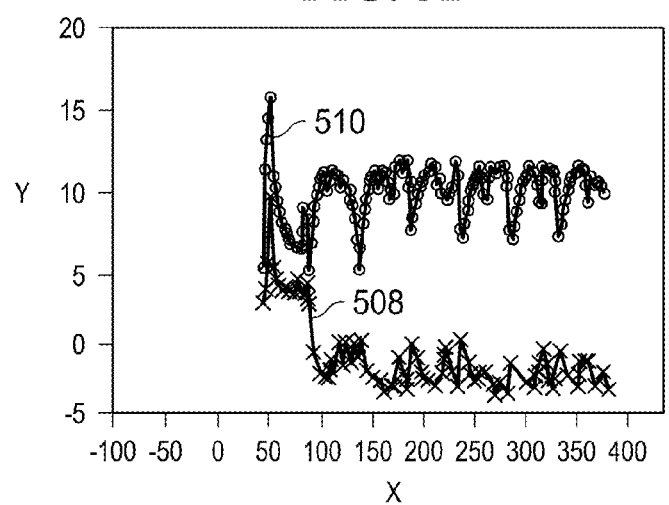
Figure 5C:
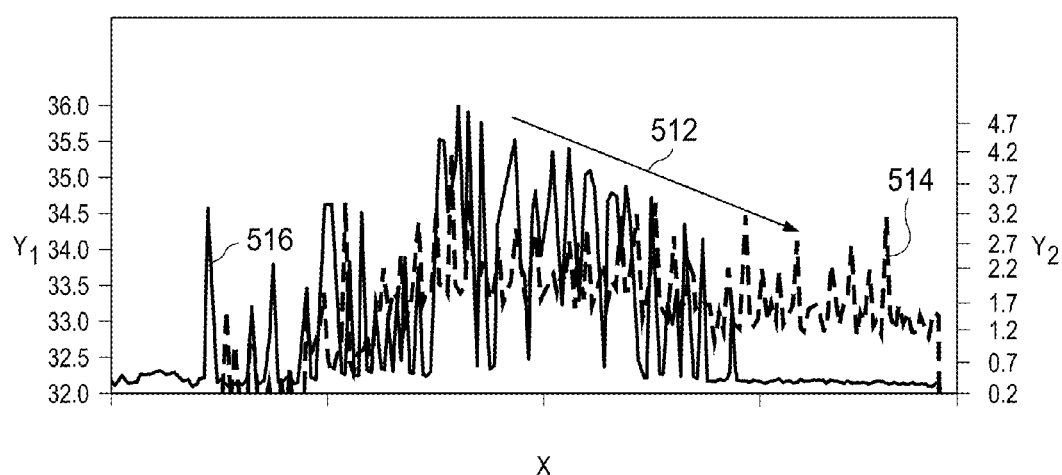

Referring to FIGS. 5A-5C, there are several diagrams illustrating the experimental results of utilizing an exemplary pull roll device 114a to draw the glass ribbon 104 downward from the forming device 102. In these experiments, the pull roll device 114a was configured such that the first roll apparatus 202 had driven vertically down-tilted draw rolls 210 and 212, the second roll apparatus 204 had idling (not driven) vertically down-tilted rolls 216 and 218, and the third roll apparatus 206 had driven vertically down-tilted draw rolls 220 and 222.

As illustrated in FIG. 5A, there is a graph representing a bow magnitude of the glass ribbon 104 at two different times when the pull roll device 114a at one time was setup where the second roll apparatus 204 was configured such that the non-driven vertically down-tilted rolls 216 and 218 provided a cross-tension 220b in the glass ribbon 104 of 19 lbs (see plot "A"). And, the pull roll device 114a was setup at the second time where the second roll apparatus 204 was configured such that the non-driven vertically down-tilted rolls 216 and 218 provided a cross-tension 220b in the glass ribbon 104 of 3.5 lbs (see plot "B"). The plots "A" and "B" have a y-axis representing a bow magnitude (mm units) in the glass ribbon 104 and the x-axis represents (mm units). The dashed line 502 represents location of the first roll apparatus 202. The dashed line 504 represents the location of the second roll apparatus 204. And, the dashed line 506 represents the location of the third roll apparatus 206. The reduction in the bow magnitude is desired because the motion in the glass ribbon 104 caused when the separation device 116 separates the glass ribbon 104 would not propagate or at least not as much into the setting region 304 which adversely affects the quality of the glass ribbon 104. Basically, the plots "A" and "B" are contour plots of glass ribbon displacement in the z direction. The y direction is distance downward from the isopipe's root 136. The x direction is horizontal across the width of the glass ribbon 104 with zero being the center of the isopipe's root 136. The y axis is oriented parallel to gravity. The z direction is perpendicular to the plane defined by the isopipe's root 136 and gravity.

As illustrated in FIG. 5B, there is a graph representing out-off plane glass position (or motion) of the glass ribbon 104 at two different times when the pull roll device 114a at one time was setup where the second roll apparatus 204 was configured such that the non-driven vertically down-tilted rolls 216 and 218 provided a cross-tension 220b in the glass ribbon 104 of 19 lbs (see line 508). And, the pull roll device 114a was setup at the second time where the second roll apparatus 204 was configured such that the non-driven vertically down-tilted rolls 216 and 218 provided a cross-tension 220b in the glass ribbon 104 of 3.5 lbs (see line 510). This graph has a y-axis representing a ribbon motion (mm) along the centerline (0, 67") of the glass ribbon 104 and the x-axis represents time (seconds). In this graph, an increase in the amplitude in the ribbon motion translates into an undesirable increase in the shape variation in the glass ribbon 104.

As illustrated in FIG. 5C, there is a graph which shows a reduction in ribbon motion (see line 512) with an increase in the cross-tension 220b caused by adjusting the downward-tilt of the pull roll device's non-driven vertically-titled rolls 216 and 218. In line 514, the out of plane ribbon position (mm units) of the $y_1$-axis is plotted vs time (5 minutes) based on the ribbon centerline in the setting zone 304 of the x-axis. In line 516, the moving standard deviation (mm units) of the out of plane ribbon position on the $y_2$-axis is plotted vs time (5 minutes) on the x-axis. In particular, the axis covers 16 hours, 48 minutes and plotted are 5 minute moving average position on $y_1$-axis and 5 minute standard deviation on $y_2$-axis. These experimental results are from one application where a specific glass composition was used but they would look similar for other glass compositions.

Furthermore, it should be appreciated that the pull roll device 114, 114a, 114b, 114c and 114d has been described above as being incorporated in a glass manufacturing system that uses a fusion process to manufacture the glass ribbon 104. It should be understood that the pull roll device 114, 114a, 114b, 114c and 114d could be incorporated within and used by any type of glass manufacturing system. For example, the pull roll device 114, 114a, 114b, 114c and 114d can be used in combination with a fusion draw, slot draw, down draw, and other glass sheet forming methods which have continuous glass sheet forming and separation processes. Accordingly, the pull roll device 114, 114a, 114b, 114c and 114d described herein should not be construed in a limited manner.

Although several embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the invention as set forth and defined by the following claims.

The invention claimed is:

1. A glass manufacturing apparatus comprising:
a forming device configured to produce a glass ribbon including a width extending between a first edge portion and a second edge portion; and
a pull roll device comprising:
a first roll apparatus including a first upstream pair of draw rolls configured to draw the first edge portion of the glass ribbon from the forming device along a draw path extending transverse to the width of the glass ribbon;
a second roll apparatus including a first midstream pair of rolls positioned downstream along the draw path from the first upstream pair of draw rolls, wherein the first midstream pair of rolls are configured to interact with the first edge portion of the glass ribbon;
a third roll apparatus including a first downstream pair of draw rolls positioned downstream along the draw path from the first midstream pair of rolls, wherein the first downstream pair of draw rolls are configured to further draw the first edge portion of the glass ribbon along the draw path; and
a control device configured to independently operate at least the first roll apparatus and the third roll apparatus such that at least one of the first upstream pair of draw rolls rotates with a substantially constant torque and at least one of the first downstream pair of draw rolls rotates with a substantially constant angular velocity.

2. The glass manufacturing apparatus of claim 1, wherein the glass ribbon is drawn downstream from the forming device through a viscous zone, a setting zone, and then an elastic zone, where the first upstream pair of draw rolls are located in the viscous zone, the first midstream pair of rolls are located in the setting zone, and the first downstream pair of draw rolls are located in the elastic zone.

3. The glass manufacturing apparatus of claim 1, wherein the glass ribbon is drawn downstream from the forming device through a viscous zone, a setting zone and then an elastic zone, where the first upstream pair of draw rolls are located in the setting zone, the first midstream pair of draw rolls are located in the setting zone, and the first downstream pair of rolls are located in the elastic zone.

4. The glass manufacturing apparatus of claim 1, wherein the first midstream pair of rolls includes vertically down-tilted rolls positioned downstream along the draw path from the first upstream pair of draw rolls, where the first midstream pair of vertically down-tilted rolls are configured to apply a lateral tension to the first edge portion of the glass ribbon.

5. The glass manufacturing apparatus of claim 1, wherein the control device is configured to operate the second roll apparatus which is driven to control at least one of the first midstream pair of rolls.

6. The glass manufacturing apparatus of claim 1, wherein the second roll apparatus is configured such that neither of the first midstream pair of rolls are driven but freely rotate when the first edge of the glass ribbon passes there between.

7. The glass manufacturing apparatus of claim 1, wherein the control device is configured to operate the first roll apparatus such that both of the first upstream pair of draw rolls rotate with a substantially constant torque.

8. The glass manufacturing apparatus of claim 1, wherein the control device is configured to operate the third roll apparatus such that both of the first downstream pair of draw rolls rotate with a substantially constant angular velocity.

9. The glass manufacturing apparatus of claim 1, wherein the first roll apparatus includes a second upstream pair of draw rolls configured to draw the second edge portion of the glass ribbon from the forming device along the draw path, wherein the control device is further configured to operate the first pull roll apparatus such that at least one of the second upstream pair of draw rolls rotates with a substantially constant torque.

10. The glass manufacturing apparatus of claim 9, wherein the control device is configured to operate the first roll apparatus such that both of the second upstream pair of draw rolls rotate with a substantially constant torque.

11. The glass manufacturing apparatus of claim 9, wherein the second roll apparatus includes a second midstream pair of rolls positioned downstream along the draw path from the second upstream pair of draw rolls, where the second midstream pair of rolls are configured to interact with the second edge portion of the glass ribbon.

12. The glass manufacturing apparatus of claim 11, wherein the second midstream pair of rolls includes vertically down-tilted rolls positioned downstream along the draw path from the second upstream pair of draw rolls, where the second midstream pair of vertically down-tilted rolls are configured to apply a lateral tension to the second edge portion of the glass ribbon.

13. The glass manufacturing apparatus of claim 9, wherein the third roll apparatus includes a second downstream pair of draw rolls positioned downstream along the draw path from the second upstream pair of draw rolls and the second midstream pair of vertically down-tilted rolls, wherein the second downstream pair of draw rolls, are configured to further draw the second edge portion of the glass ribbon along the draw path, and the control device is further configured to operate the second pull roll apparatus such that at least one of the second downstream pair of draw rolls rotates with a substantially constant angular velocity.

14. The glass manufacturing apparatus of claim 13, wherein the control device is configured to operate the third roll apparatus such that both of the second downstream pair of draw rolls rotate with a substantially constant angular velocity.

15. A method of manufacturing a glass ribbon, the method comprising the steps of:
providing a pull roll device comprising:
a first roll apparatus including a first upstream pair of draw rolls;
a second roll apparatus including a first midstream pair of rolls positioned downstream along the draw path from the first upstream pair of draw rolls; and
a third roll apparatus including a first downstream pair of draw rolls positioned downstream along the draw path from the first midstream pair of rolls,
forming a glass ribbon with a width extending between a first edge portion and a second edge portion;
independently operating the first roll apparatus such that at least one of the first upstream pair of draw rolls rotates with a substantially constant torque to draw the first edge portion of the glass ribbon along the draw path; and
independently operating the third roll apparatus such that at least one of the first downstream pair of draw rolls rotates with a substantially constant angular velocity to further draw the first edge portion of the glass ribbon along the draw path.

16. The method of claim 15, further comprising a step of adjusting a down-tilted position of the first midstream pair of rolls positioned downstream to apply a lateral tension to the first edge portion of the glass ribbon.

17. The method of claim 15, wherein the glass ribbon is drawn downstream through a viscous zone, a setting zone, and then an elastic zone, where the first upstream pair of draw rolls are located in the viscous zone, the first midstream pair of rolls are located in the setting zone, and the first downstream pair of draw rolls are located in the elastic zone.

18. The method of claim 15, wherein the glass ribbon is drawn downstream through a viscous zone, a setting zone and then an elastic zone, where the first upstream pair of draw rolls are located in the setting zone, the first midstream pair of rolls are located in the setting zone, and the first downstream pair of draw rolls are located in the elastic zone.

19. A method of manufacturing a glass ribbon, the method comprising the steps of:
providing a pull roll device comprising:
a first roll apparatus including a first upstream pair of draw rolls;
a second roll apparatus including a first midstream pair of rolls positioned downstream along the draw path from the first upstream pair of draw rolls; and
a third roll apparatus including a first downstream pair of draw rolls positioned downstream along the draw path from the first midstream pair of rolls,
forming a glass ribbon with a width extending between a first edge portion and a second edge portion;
independently operating the first roll apparatus over a period of time such that the first upstream pair of draw rolls apply a substantially constant force to the first edge portion of the glass ribbon along the draw path;
independently operating the third roll apparatus over the period of time such that at least one of the first downstream pair of draw rolls rotates with a substantially constant angular velocity and the first downstream pair of draw rolls apply a varying force to the first edge portion of the glass ribbon along the draw path.

20. The method of claim 19, further comprising the step of sequentially separating a plurality of glass sheets from the glass ribbon over the period of time at a location downstream along the draw path from the first downstream pair of draw rolls.

21. The method of claim 19, further comprising the step of rolling the glass ribbon into a wound coil of glass at a location downstream along the draw path from the first downstream pair of draw rolls.

22. The method of claim 19, wherein the glass ribbon is drawn downstream through a viscous zone, a setting zone, and then an elastic zone, where the first upstream pair of draw rolls are located in the viscous zone, the first midstream pair of rolls are located in the setting zone, and the first downstream pair of draw rolls are located in the elastic zone.

23. The method of claim 19, wherein the glass ribbon is drawn downstream through a viscous zone, a setting zone and then an elastic zone, where the first upstream pair of draw rolls are located in the setting zone, the first midstream pair of rolls are located in the setting zone, and the first downstream pair of draw rolls are located in the elastic zone.

\* \* \* \* \*